United States Patent
Lee et al.

(10) Patent No.: US 12,376,036 B2
(45) Date of Patent: Jul. 29, 2025

(54) METHOD AND APPARATUS FOR REPORTING TERMINAL ASSISTANCE INFORMATION ASSOCIATED WITH OVERHEATING AND POWER SAVING MODE OPERATION IN NEXT GENERATION WIRELESS COMMUNICATION SYSTEM

(71) Applicant: Samsung Electronics Co., Ltd., Suwon-si (KR)

(72) Inventors: Taeseop Lee, Suwon-si (KR); Sangyeob Jung, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 18/084,750

(22) Filed: Dec. 20, 2022

(65) Prior Publication Data

US 2023/0199658 A1 Jun. 22, 2023

(30) Foreign Application Priority Data

Dec. 21, 2021 (KR) ........................ 10-2021-0183976

(51) Int. Cl.
*H04W 52/00* (2009.01)
*H04B 7/0413* (2017.01)
*H04W 52/02* (2009.01)

(52) U.S. Cl.
CPC ...... *H04W 52/0235* (2013.01); *H04B 7/0413* (2013.01)

(58) Field of Classification Search
CPC ...... H04B 7/0413; H04W 8/24; H04W 24/10; H04W 52/0209; H04W 52/0216; H04W 52/0225; H04W 52/0229; H04W 52/0235; H04W 52/0238; H04W 52/028; Y02D 30/70

See application file for complete search history.

(56) References Cited

U.S. PATENT DOCUMENTS

| | | | |
|---|---|---|---|
| 10,111,128 B2 | 10/2018 | Koc et al. | |
| 10,880,805 B2* | 12/2020 | Jia | H04W 36/0061 |
| 11,785,540 B2* | 10/2023 | Gurumoorthy | H04W 52/0209 |
| | | | 455/574 |
| 2020/0229076 A1* | 7/2020 | Jin | H04W 8/24 |
| 2021/0352588 A1 | 11/2021 | Liu et al. | |
| 2022/0361110 A1* | 11/2022 | Lee | H04B 7/0413 |
| 2023/0412460 A1* | 12/2023 | Van Der Velde | |
| | | | H04W 52/0212 |

(Continued)

FOREIGN PATENT DOCUMENTS

WO 2021/238921 A1 12/2021

OTHER PUBLICATIONS

Huawei, HiSilicon, Discussion on overheating assistance report for SCG in EN-DC, 3GPP TSG-RAN WG2 Meeting #118bis-e, R2-2204872, 10 pages, May 9,-May 20, 2022.*

(Continued)

*Primary Examiner* — Frank Duong
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method and an apparatus for reporting user equipment (UE) assistance information related to overheating and power-saving are provided.

20 Claims, 16 Drawing Sheets

(56) References Cited

U.S. PATENT DOCUMENTS

2024/0195594 A1* 6/2024 Araujo .................. H04W 76/34

OTHER PUBLICATIONS

Huawei, HiSilicon, Clarification for overheating assistance information reporting, 3GPP TSG-RAN WG2 Meeting #115 electronic, R2-2108571, 5 pages. Aug. 9,-Aug. 27, 2021.*
Samsung, [E048] Overheating assistance information for FR2-2 in (NG)EN-DC, 3GPP TSG RAN WG2 Meeting #118-e, R2-2205051, 4 pages, May 9,-May 20, 2022.*
Intel Corporation, "Further consideration of Capability differentiation between FR2-1 and FR2-2", NR_ext_to_71GHz-Core—Release 17, R2-2109883, 3GPP TSG-RAN WG2 Meeting #116 Electronic R2-2109883 Elbonia, Nov. 1-12, 2021.
Intel Corporation, Further consideration of Capability differentiation between FR2-1 and FR2-2, R2-2109883, 3GPP TSG-RAN WG2 Meeting #116-e, Oct. 22, 2021, Elbonia.
RAN4 Chair (Huawei), Moderator's summary for discussion [RAN93e-R18Prep-17] Potential RAN4 enhancements, RP-211667, 3GPP TSG-RAN Meeting #93-e, Sep. 4, 2021.
Nokia, et al., UL gaps for FR2, R2-2109798, 3GPP Tsg-Ran WG2 Meeting #116-e, Oct. 22, 2021, Elbonia.
International Search Report dated Mar. 23, 2023, issued in an International Application No. PCT/KR2022/020841.

* cited by examiner

FIG. 1D

| Name | | Frequency Range |
|---|---|---|
| FR1 | | 410 MHz ~ 7.125 GHz |
| FR2 | FR2-1 | 24.25 GHz ~ 52.6 GHz |
| | FR2-1 | 52.6 GHz ~ 71 GHz |

1d-05 — FR1 row
1d-10 — FR2 row
1d-15, 1d-20

FIG. 1EA

```
UE Capability information related with overheating

UE-NR-Capability-v1540 ::=        SEQUENCE {
    sdap-Parameters                   SDAP-Parameters                           OPTIONAL,
    overheatingInd                    ENUMERATED {supported}                    OPTIONAL,
    ims-Parameters                    IMS-Parameters                            OPTIONAL,
    fr1-Add-UE-NR-Capabilities-v1540  UE-NR-CapabilityAddFRX-Mode-v1540         OPTIONAL,
    fr2-Add-UE-NR-Capabilities-v1540  UE-NR-CapabilityAddFRX-Mode-v1540         OPTIONAL,
    fr1-fr2-Add-UE-NR-Capabilities    UE-NR-CapabilityAddFRX-Mode               OPTIONAL,
    nonCriticalExtension              UE-NR-Capability-v1550                    OPTIONAL,
}

<< omitted >>

UE-NR-Capability-v17xy ::=        SEQUENCE {
    <<omitted>>
    overheatingInd-r17                ENUMERATED {supported}                    OPTIONAL,
    <<omitted>>
    nonCriticalExtension              SEQUENCE {}                               OPTIONAL
}
```

UE Capability information related with power-saving  1e-10

```
UE-NR-Capability-v1610 ::=           SEQUENCE {
    <<omitted>>
    powSav-Parameters-r16            PowSav-Parameters-r16           OPTIONAL,
    <<omitted>>
    nonCriticalExtension             UE-NR-Capability-v1640          OPTIONAL,
}
PowSav-Parameters-r16 ::=            SEQUENCE {
    powSav-ParametersCommon-r16      PowSav-ParametersCommon-r16     OPTIONAL,
    powSav-ParametersFRX-Diff-r16    PowSav-ParametersFRX-Diff-r16   OPTIONAL,
    ...
}
PowSav-ParametersFRX-Diff-r16 ::=    SEQUENCE {
    maxBW-Preference-r16             ENUMERATED {supported}          OPTIONAL,
    maxMIMO-LayerPreference-r16      ENUMERATED {supported}          OPTIONAL,
    ...
}
PowSav-Parameters-v17xy ::=          SEQUENCE {
    powSav-Parameters-r17            PowSav-Parameters-r17           OPTIONAL,
    ...
}

PowSav-Parameters-r17 ::=            SEQUENCE {
    maxBW-Preference-r17             ENUMERATED {supported}          OPTIONAL,
    maxMIMO-LayerPreference-r17      ENUMERATED {supported}          OPTIONAL,
    ...
}

UE-NR-Capability-v17xy ::=           SEQUENCE {
    <<omitted>>
    powSav-Parameters-v17xy          PowSav-Parameters-v17xy         OPTIONAL,
    <<omitted>>
    nonCriticalExtension             SEQUENCE { }                    OPTIONAL
}
```

FIG. 1FA

```
Legacy fields related with overheating in UEAssistanceInforamtion

OverheatingAssistance ::=    SEQUENCE {
    reducedMaxCCs                ReducedMaxCCs-r16           OPTIONAL,
    reducedMaxBW-FR1             ReducedMaxBW-FRx-r16        OPTIONAL,
    reducedMaxBW-FR2             ReducedMaxBW-FRx-r16        OPTIONAL,
    reducedMaxMIMO-LayersFR1     SEQUENCE {
        reducedMIMO-LayersFR1-DL     MIMO-LayersDL,
        reducedMIMO-LayersFR1-UL     MIMO-LayersUL
    } OPTIONAL,
    reducedMaxMIMO-LayersFR2     SEQUENCE {
        reducedMIMO-LayersFR2-DL     MIMO-LayersDL,
        reducedMIMO-LayersFR2-UL     MIMO-LayersUL
    } OPTIONAL
}
```

Potential new fields related with overheating in UEAssistanceInforamtion

```
OverheatingAssistance-r17::=         SEQUENCE {
    reducedMaxCCs                        ReducedMaxCCs-r16              OPTIONAL,
    reducedMaxBW-FR1-r17                 ReducedMaxBW-FRx-r16           OPTIONAL,
    reducedMaxBW-FR2-1-r17               ReducedMaxBW-FRx-r16           OPTIONAL,
    reducedMaxBW-FR2-2-r17               ReducedMaxBW-FRx-r16           OPTIONAL, reducedMaxMIMO-Layers FR1-r17        SEQUENCE {
        reducedMIMO-LayersFR1-DL             MIMO-LayersDL,
        reducedMIMO-LayersFR1-UL             MIMO-LayersUL
    } OPTIONAL,
    reducedMaxMIMO-Layers FR2-1-r17      SEQUENCE {
        reducedMIMO-LayersFR2-1-DL-r17       MIMO-LayersDL,
        reducedMIMO-LayersFR2-1-UL-r17       MIMO-LayersUL
    } OPTIONAL,
    reducedMaxMIMO-Layers FR2-2-r17      SEQUENCE {
        reducedMIMO-LayersFR2-2-DL-r17       MIMO-LayersDL,
        reducedMIMO-LayersFR2-2-UL-r17       MIMO-LayersUL
    } OPTIONAL
}
```

Legacy fields related with power-saving in UEAssistanceInforamtion

```
MaxBW-Preference-r16 ::=           SEQUENCE {
    reducedMaxBW-FR1-r16               ReducedMaxBW-FRx-r16                OPTIONAL,
    reducedMaxBW-FR1-r16               ReducedMaxBW-FRx-r16                OPTIONAL,
}

MaxMIMO-LayerPreference-r16 ::=    SEQUENCE {
    reducedMaxMIMO-LayersFR1-r16       SEQUENCE {
        reducedMIMO-LayersFR1-DL-r16       INTEGER (1..8),
        reducedMIMO-LayersFR1-UL-r16       INTEGER (1..4)}     OPTIONAL,
    reducedMaxMIMO-LayersFR2-r16       SEQUENCE {
        reducedMIMO-LayersFR2-DL-r16       INTEGER (1..8),
        reducedMIMO-LayersFR2-UL-r16       INTEGER (1..4)}     OPTIONAL
}
```

Potential new fields related with power-saving in UEAssistanceInformation

```
MaxBW-Preference-r17::= SEQUENCE {
    reducedMaxBW-FR1-r17       ReducedMaxBW-FRx-r16    OPTIONAL,
    reducedMaxBW-FR2-1-r17     ReducedMaxBW-FRx-r16    OPTIONAL,
    reducedMaxBW-FR2-2-r17     ReducedMaxBW-FRx-r16    OPTIONAL,
}

MaxMIMO-LayerPreference-r17::= SEQUENCE {
    reducedMaxMIMO-Layers FR1-r17       SEQUENCE {
        reducedMIMO-LayersFR1-DL-r17        INTEGER (1..8),
        reducedMIMO-LayersFR1-UL-r17        INTEGER (1..4)}      OPTIONAL,
    reducedMaxMIMO-Layers FR2-1-r17     SEQUENCE {
        reducedMIMO-LayersFR2-1-DL-r17      INTEGER (1..8),
        reducedMIMO-LayersFR2-1-UL-r17      INTEGER (1..4)}      OPTIONAL,
    reducedMaxMIMO-Layers FR2-2-r17     SEQUENCE {
        reducedMIMO-LayersFR2-2-DL-r17      INTEGER (1..8),
        reducedMIMO-LayersFR2-2-UL-r17      INTEGER (1..4)}      OPTIONAL,
```

1g-10

FIG. 1H 1h-05 — Option A (Independently configured using separate prohibit timer)

1h-10
```
OtherConfig-v17xy ::=    SEQUENCE {
    overheatingAssistanceConfig-r17    SetupRelease {OverheatingAssistanceConfig-r17}    OPTIONAL, -- Need M
    ...
}
```

1h-15
```
OverheatingAssistanceConfig-r17 ::= SEQUENCE {
    overheatingIndicationProhibitTimer-r17    ENUMERATED {s0, s0dot5, s1, s2, s5, s10, s20, s30, s60, s90, s120, s300, s600, spare3, spare2, spare1}
    ...
}
```

1h-20 — Option B (Dependently configured using separate prohibit timer)

1h-25
```
OtherConfig-v1540 ::=    SEQUENCE {
    overheatingAssistanceConfig    SetupRelease {OverheatingAssistanceConfig}    OPTIONAL, -- Need M
    [ overheatingAssistanceConfig    ENUMERATED {true}    OPTIONAL, -- Cond overheating
    ]
}
```

FIG. 1I

```
1i-05  [Option A [Independently configured using separate prohibit timer]

1i-10   OtherConfig-v17xy ::=                  SEQUENCE {
            maxBW-PreferenceConfig-r17          SetupRelease {MaxBW-PreferenceConfig-r17}           OPTIONAL, -- Need M
            maxMIMO-LayerPreferenceConfig-r17   SetupRelease {MaxMIMO-LayerPreferenceConfig-r17}    OPTIONAL, -- Need M
1i-15   }

1i-20   MaxBW-PreferenceConfig-r17 ::=         SEQUENCE {
            maxBW-PreferenceProhibitTimer-r17   ENUMERATED {s0, s0dot5, s1, s2, s3, s4, s5, s6, s7, s8, s9, s10, s20, s30, spare2, spare1}
        }

1i-25   MaxMIMO-LayerPreferenceConfig-r17 ::=  SEQUENCE {
            maxMIMO-LayerPreferenceProhibitTimer-r17 ENUMERATED {s0, s0dot5, s1, s2, s3, s4, s5, s6, s7, s8, s9, s10, s20, s30, spare2, spare1}
        }

1i-30  [Option B [Dependently configured using separate prohibit timer]

1i-35   OtherConfig-v17xy ::=                  SEQUENCE {
            maxBW-PreferenceConfig-r17          ENUMERATED {true}     OPTIONAL, -- Cond maxBW
            maxMIMO-LayerPreferenceConfig-r17   ENUMERATED {true}     OPTIONAL, -- Cond maxMIMO
1i-40   }
```

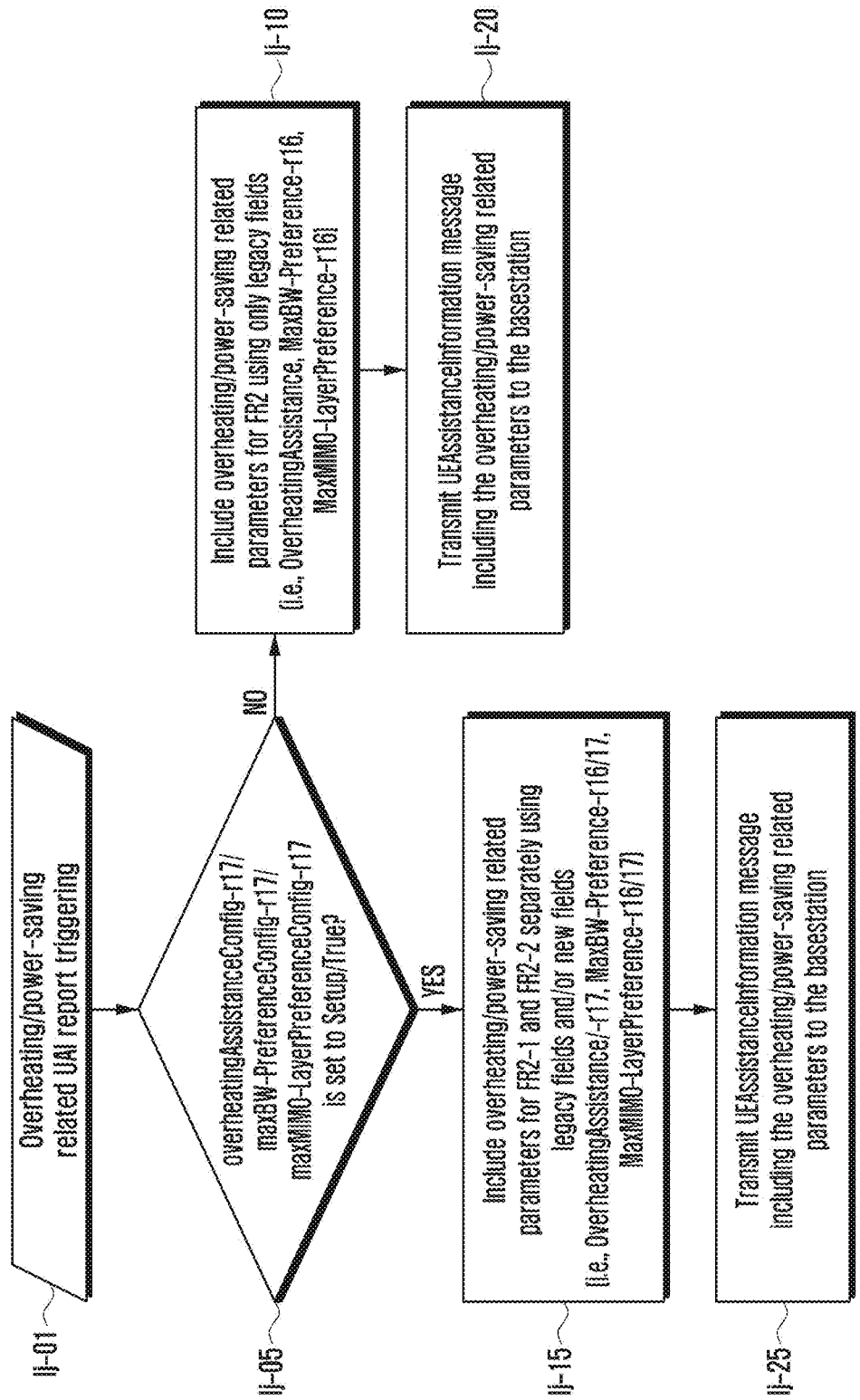

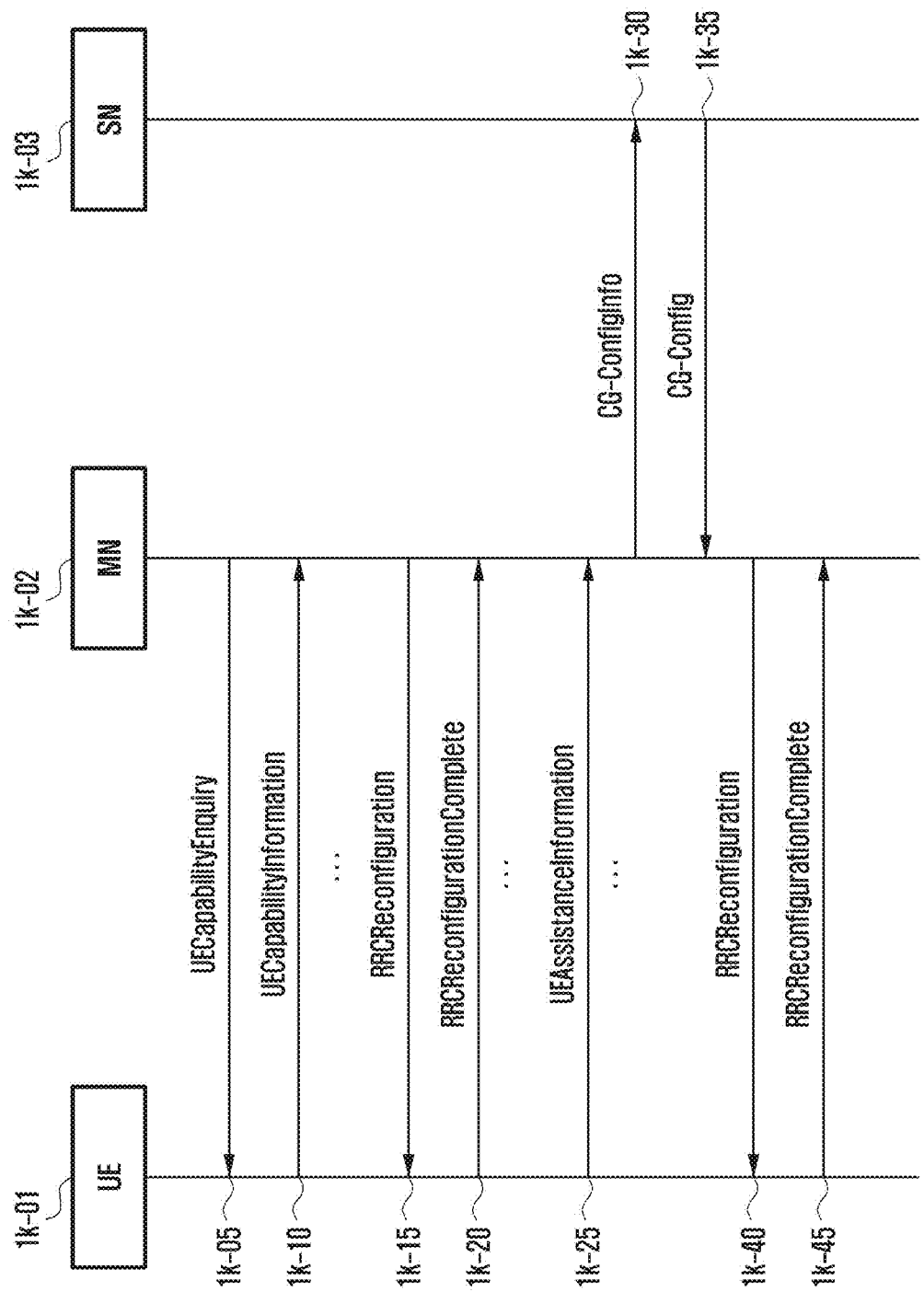

METHOD AND APPARATUS FOR REPORTING TERMINAL ASSISTANCE INFORMATION ASSOCIATED WITH OVERHEATING AND POWER SAVING MODE OPERATION IN NEXT GENERATION WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0183976, filed on Dec. 21, 2021, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for reporting terminal assistance information in a next-generation wireless communication system.

2. Description of Related Art

Fifth generation (5G) mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service-based architecture or service-based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Meanwhile, with the recent development of communication systems, the demand for methods for efficiently supporting operations of a heat generation (or overheating) mode and a power saving mode is increasing day by day.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively providing services in a next-generation wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes transmitting, to a base station, information on capability of the terminal including information indicating whether the terminal supports to transmit at least one parameter for a power saving associated with a frequency range 2-2, receiving, from the base station, first configuration information for configuring the terminal to transmit at least one parameter for a power saving associated with a frequency range 2-1 and second configuration information for configuring the terminal to transmit the at least one parameter for the power saving associated with the frequency range 2-2, and transmitting, to the base station, assistance information on the terminal, the assistance information on the terminal comprising information on the at least one parameter for the power saving associated with the frequency range 2-2.

In an embodiment, the information indicating whether the terminal supports to transmit the at least one parameter for the power saving associated with a frequency range 2-2 comprises at least one of information whether the terminal supports to transmit information on a maximum aggregated bandwidth preference associated with the frequency range 2-2 or information whether the terminal supports to transmit information on a maximum number of multi input multi output (MIMO) layer preference associated with the frequency range 2-2.

In an embodiment, the information on the at least one parameter for the power saving associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

In an embodiment, the first configuration information comprises information on a prohibit timer for a power saving.

In an embodiment, the information on the at least one parameter for the power saving associated with the frequency range 2-2 is transmitted based on the prohibit timer.

In an embodiment, the method further comprises receiving, from the base station, third configuration information for configuring the terminal to transmit information on an overheating of the terminal, and transmitting, to the base station, the information on the overheating of the terminal associated with the frequency range 2-1 and the information on the overheating of the terminal associated with the frequency range 2-2.

In an embodiment, the information on the overheating associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

In an embodiment, the frequency range 2-1 corresponds to a frequency range from 24250 megahertz (MHz) to 52600 MHz and the frequency range 2-2 corresponds to a frequency range from 52600 MHz to 71000 MHz.

In accordance with another aspect of the disclosure, a method performed by a base station in a wireless communication system is provided. The method includes receiving, from a terminal, information on capability of the terminal including information indicating whether the terminal supports to transmit at least one parameter for a power saving associated with a frequency range 2-2, transmitting, to the terminal, first configuration information for configuring the terminal to transmit at least one parameter for a power saving associated with a frequency range 2-1 and second configuration information for configuring the terminal to transmit the at least one parameter for the power saving associated with the frequency range 2-2, and receiving, from the terminal, assistance information on the terminal, the assistance information on the terminal comprising information on the at least one parameter for the power saving associated with the frequency range 2-2.

In an embodiment, the method further comprises transmitting, to the terminal, third configuration information for configuring the terminal to transmit information on an overheating of the terminal, and receiving, from the terminal, the information on the overheating of the terminal associated with the frequency range 2-1 and the information on the overheating of the terminal associated with the frequency range 2-2.

In an embodiment, the information on the overheating associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

In accordance with another aspect of the disclosure, a terminal in a wireless communication system is provided. The terminal includes a transceiver, and a controller coupled with the transceiver and configured to transmit, to a base station, information on capability of the terminal including information indicating whether the terminal supports to transmit at least one parameter for a power saving associated with a frequency range 2-2, receive, from the base station, first configuration information for configuring the terminal to transmit at least one parameter for a power saving associated with a frequency range 2-1 and second configuration information for configuring the terminal to transmit the at least one parameter for the power saving associated with the frequency range 2-2, and transmit, to the base station, assistance information on the terminal, the assistance information on the terminal comprising information on the at least one parameter for the power saving associated with the frequency range 2-2.

In accordance with another aspect of the disclosure, a base station in a wireless communication system is provided. The base station includes a transceiver, and a controller coupled with the transceiver and configured to receive, from a terminal, information on capability of the terminal including information indicating whether the terminal supports to transmit at least one parameter for a power saving associated with a frequency range 2-2, transmit, to the terminal, first configuration information for configuring the terminal to transmit at least one parameter for a power saving associated with a frequency range 2-1 and second configuration information for configuring the terminal to transmit the at least one parameter for the power saving associated with the frequency range 2-2, and receive, from the terminal, assistance information on the terminal, the assistance information on the terminal comprising information on the at least one parameter for the power saving associated with the frequency range 2-2.

Through various embodiments of the disclosure, it is possible to effectively provide services in a next-generation wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1D is a diagram illustrating names and ranges of frequency domains defined in an NR system according to an embodiment of the disclosure;

FIGS. 1EA and 1EB are diagrams illustrating UE capability information on whether parameters corresponding to the FR2-1 band and the FR2-2 band may be reported separately when a UE transmits UE assistance information related to overheating and power-saving to the base station according to various embodiments of the disclosure;

FIGS. 1FA and 1FB are diagrams illustrating a newly defined UE assistance information so that the UE may report parameters corresponding to the FR2-1 band and the FR2-2 band separately when transmitting UE assistance information related to overheating to the base station according to various embodiments of the disclosure;

FIGS. 1GA and 1GB are diagrams illustrating a newly defined user assistance information so that a UE may report parameters corresponding to the FR2-1 band and the FR2-2 band separately when transmitting UE assistance information related to power-saving to the base station according to various embodiments of the disclosure;

FIG. 1H is a diagram illustrating base station configuration information for instructing a UE to separately report parameters corresponding to the FR2-1 band and the FR2-2 band when transmitting UE assistance information related to overheating to the base station according to an embodiment of the disclosure;

FIG. 1I is a diagram illustrating base station configuration information for instructing a UE to separately report parameters corresponding to the FR2-1 band and the FR2-2 band when transmitting UE assistance information related to power-saving to the base station according to an embodiment of the disclosure;

FIG. 1J is a flowchart illustrating an operation method in which a UE identifies the base station configuration information described in FIG. 1H/1I and then configures and reports parameters corresponding to the FR2 band according to the configured information when transmitting UE assistance information related to overheating and power-saving to the base station according to an embodiment of the disclosure;

FIG. 1K is a diagram illustrating a procedure in which a UE reports overheating-related UE assistance information related to secondary cell group (SCG) to the master node (MN), the master node transmits the information to the secondary node (SN), and the secondary node modifies the SCG-related configuration information and transmits the same to the UE again through the master node in a dual connectivity situation according to an embodiment of the disclosure;

Throughout the drawings, like reference numerals will be understood to refer to like parts, components, and structures.

DETAILED DESCRIPTION

Figure 1A:
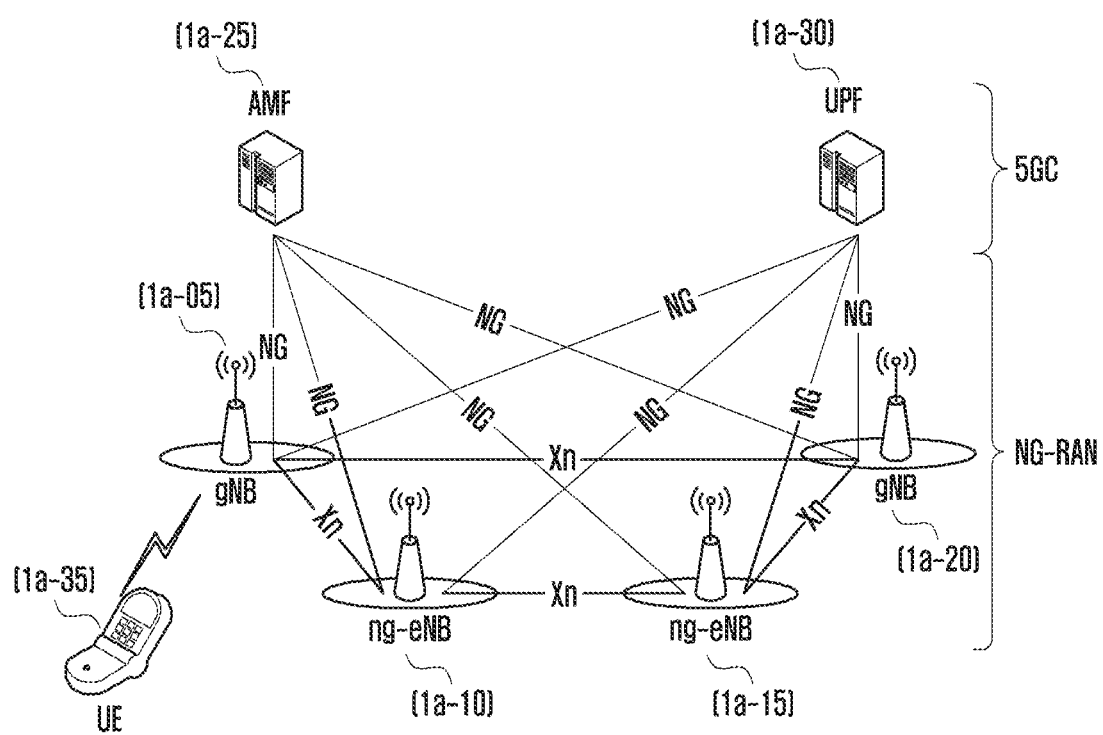
FIG. 1A is a diagram illustrating a structure of new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the convenience of description. Therefore, the disclosure is not limited by the terms as used below, and other terms referring to subjects having equivalent technical meanings may be used.

In the following description, the terms "physical channel" and "signal" may be interchangeably used with the term "data" or "control signal". For example, the term "physical downlink shared channel (PDSCH)" refers to a physical channel over which data is transmitted, but the PDSCH may be used to refer to "data". For example, in the disclosure, the expression "transmitting a physical channel" may be construed as the meaning equivalent to "transmitting data or a signal over a physical channel".

In the following description of the disclosure, higher signaling refers to a signal transfer scheme from a base station to a terminal via a downlink data channel of a physical layer, or from a terminal to a base station via an uplink data channel of a physical layer. The higher signaling may also be understood as radio resource control (RRC) signaling or a media access control (MAC) control element (CE).

In the following description, the disclosure will be described using terms and names defined in the $3^{rd}$ generation partnership project new radio (3GPP NR) or 3rd generation partnership project long term evolution (3GPP LTE) standards for the convenience of description. However, the disclosure is not limited by these terms and names, and may be applied in the same way to systems that conform other standards. In the disclosure, the term "gNode B (gNB)" may be interchangeably used with the term "eNode B (eNB)" for the convenience of description. For example, a base station described as "eNB" may indicate "gNB". Also, the term "terminal" may refer to mobile phones, MTC devices, NB-IoT devices, sensors, and other wireless communication devices.

In the following description, a base station is an entity that allocates resources to terminals, and may be at least one of a gNode B (gNB), an eNode B (eNB), a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

The disclosure relates to a method and apparatus for reporting UE assistance information (UAI) related to overheating and power-saving operations to a base station in a next-generation wireless communication system. More specifically, the disclosure relates to a method and apparatus for separately reporting UE assistance information related to overheating and power-saving applied for each subdivided range as NR's operating range, which was previously limited to 52.6 GHz or lower, has been extended to 71 GHz, FR2 frequency range (24.25 GHz-52.6 GHz), which was previously defined to include up to the 71 GHz band, was further divided into FR2-1 (24.25 GHz-52.5 GHz) and FR2-2 (52.6 GHz-71 GHz) ranges in the 3GPP 5G new radio (NR).

The disclosure describes a method for reporting UE capability information indicating whether to support individual reporting for FR2-1 and FR2-2 bands when a UE reports overheating/power-saving related UE assistance information in a wireless communication system, a method for configuring a base station to report overheating/power-saving UE assistance information to a supportable UE by dividing the FR2-1 and FR2-2 bands after identifying the capability information of the UE, and a method and apparatus for a UE to additionally report FR2-1 and FR2-2 band-related information separately from existing FR2-related information according to base station configurations.

Through the disclosure, the UE may subdivide the FR2 band and individually report UE assistance information related to overheating/power-saving operation in the FR2-1 band and the FR2-2 band to the base station, and based on this, the base station may subdivide and reconfigure the operation in each band, thereby controlling overheating/power-saving problems in the UE and optimizing to perform the data transmission service required in the upper layer simultaneously.

FIG. 1A is a diagram illustrating a structure of an NR system according to an embodiment of the disclosure.

Referring to FIG. 1A, a wireless communication system may include several base stations (e.g., gNB 1a-05, ng-eNB 1a-10, ng-eNB 1a-15, and gNB 1a-20), an access and mobility management function (AMF) 1a-25, and a user plane function (UPF) 1a-30. A user equipment (UE or terminal) 1a-35 may access an external network through the base stations (e.g., gNB 1a-05, ng-eNB 1a-10, ng-eNB 1a-15, and gNB 1a-20) and the UPF 1a-30.

Referring to FIG. 1A, the base stations (e.g., gNB 1a-05, ng-eNB 1a-10, ng-eNB 1a-15, and gNB 1a-20) are access nodes of a cellular network and may provide wireless access to UEs 1a-35 accessing the network. For example, the base stations (e.g., gNB 1a-05, ng-eNB 1a-10, ng-eNB 1a-15, and gNB 1a-20) may support the connection between the UEs 1a-35 and the core network (CN, core network, especially, CN of NR is called 5GC) by collecting and scheduling state information, such as buffer status, available transmit power status, channel status, or the like, of the UEs 1a-35 in order to service traffic of users. On the other hand, in communication, a user plane (UP) related to the transmission of actual user data and a control plane (CP), such as connection management may be divided and configured, and in FIG. 1A, the gNB 1a-05 and the gNB 1a-20 may use UP and CP technologies defined in NR technology, and although the ng-eNB 1a-10 and the ng-eNB 1a-15 are connected to 5GC, they may use UP and CP technologies defined in LTE technology.

The AMF 1a-25 is an apparatus in charge of various control functions as well as mobility management functions for the UE 1a-35 and may be connected to a plurality of base stations 1a-05, 1a-10, 1a-15, and 1a-20, and the UPF 1a-30 may refer to a kind of gateway apparatus providing data transmission. Although not illustrated in FIG. 1A, the NR wireless communication system may include a session management function (SMF). The SMF may manage a packet data network connection, such as a protocol data unit (PDU) session provided to the UE 1a-35.

Figure 1B:
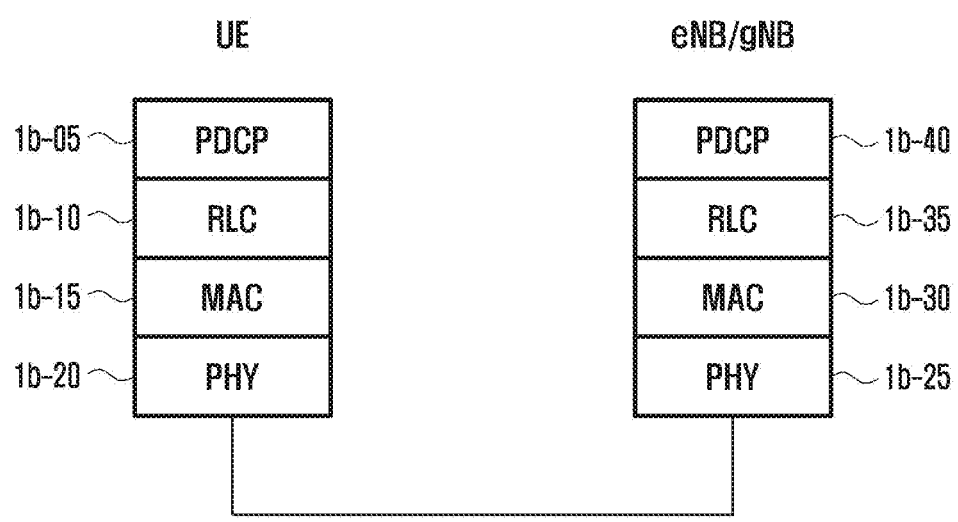
FIG. 1B is a diagram illustrating a wireless protocol structure in long-term evolution (LTE) and NR systems according to an embodiment of the disclosure.

FIG. 1B is a diagram illustrating a wireless protocol structure in LTE and NR systems according to an embodiment of the disclosure.

Referring to FIG. 1B, the wireless protocol of the LTE system may be including packet data convergence protocol (PDCP) 1b-05 and 1b-40, radio link control (RLC) 1b-10 and 1b-35, and medium access control (MAC) 1b-15 and 1b-30 in a UE and an eNB, respectively. The PDCPs 1b-05 and 1b-40 are in charge of operations, such as IP header compression/decompression, and the RLCs 1b-10 and 1b-35 reconstruct the PDCP protocol data unit (PDU) into an appropriate size. The MACs 1b-15 and 1b-30 are connected to several RLC layers configured in one UE, and perform operations of multiplexing RLC PDUs to MAC PDUs and de-multiplexing RLC PDUs from MAC PDUs. The physical (PHY) layers 1b-20 and 1b-25 channel-code and modulate upper layer data to make orthogonal frequency division multiplexing (OFDM) symbols, and transmit them through a wireless channel, or demodulate the OFDM symbols received through the wireless channel, perform channel decoding, and transmit the OFDM symbols to upper layers. In addition, Hybrid automatic repeat request (HARQ) is used for additional error correction in the physical layer, and the receiving end transmits whether the packet transmitted from the transmitting end has been received with 1 bit. This is referred to as HARQ acknowledgement/negative acknowledgement (ACK/NACK) information. Downlink HARQ ACK/NACK information for uplink data transmission may be transmitted through a physical Hybrid-ARQ indicator channel (PHICH) physical channel in case of LTE, and in case of NR, it is possible to determine whether retransmission is necessary or new transmission may be performed through scheduling information of a corresponding UE in a physical dedicated control channel (PDCCH) which is a channel through which downlink/uplink resource allocation is transmitted. This is because asynchronous HARQ is applied in NR. Uplink HARQ ACK/NACK information for downlink data transmission may be transmitted through a physical uplink control channel (PUCCH) or a physical uplink shared channel (PUSCH). The PUCCH is generally transmitted in uplink of a primary cell (PCell) which will be described later, but in a case where the base station is supported by the UE, the PUCCH may be additionally transmitted to the corresponding UE in a secondary cell (SCell) which will be described later, and is referred to as a PUCCH SCell.

Although not illustrated in FIG. 1B, a radio resource control (RRC) layer may exist above the PDCP layers 1b-05 and 1b-40 of the control plane protocol stack of the UE and the base station, respectively and transmit and receive access and measurement-related configuration control messages for radio resource control. In addition, a service data adaptation protocol (SDAP) layer may exist above the PDCP layers 1b-05 and 1b-40 of the user plane protocol stacks of the UE and the base station, respectively, and may be responsible for quality of service (QoS) flow and management.

On the other hand, the PHY layers 1b-20 and 1b-25 may be including one or a plurality of frequencies/carriers, and a technology for simultaneously configuring and using a plurality of frequencies is called carrier aggregation (CA). CA technology may drastically increase the transmission amount by the number of subcarriers by additionally using a primary carrier and one or more subcarriers instead of using only one carrier for communication between a terminal (or user equipment (UE)) and a base station (evolved-universal terrestrial radio access network (E-UTRAN) NodeB, eNB or next generation Node B (gNB)). On the other hand, in LTE, a cell within a base station using a primary carrier is referred to as a primary cell or a PCell, and a cell within a base station using a subcarrier is referred to as a secondary cell or SCell.

Figure 1C:
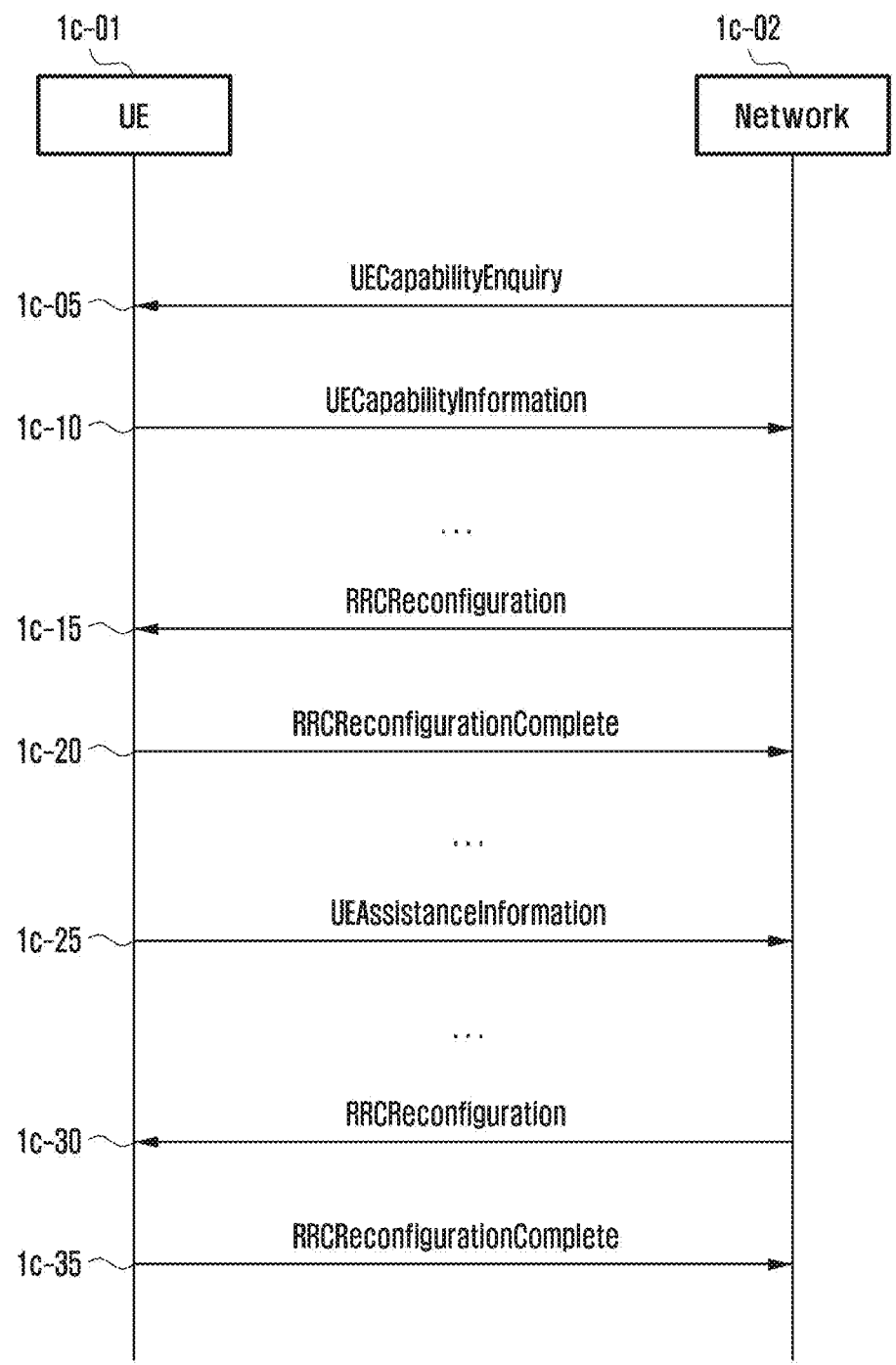
FIG. 1C is a diagram illustrating a procedure of requesting and reporting UE assistance information (UAI) between a UE and a base station according to an embodiment of the disclosure.

FIG. 1C is a diagram illustrating a procedure of requesting and reporting UE assistance information (UAI) between a UE and a base station according to an embodiment of the disclosure.

Referring to FIG. 1C, a UE 1c-01 may report UE assistance information related to overheating/power-saving operation to the corresponding base station 1c-02 while connected to the network (or serving base station) 1c-02 (hereinafter referred to as the base station), and based on this, the base station 1c-02 may reconfigure the connection to satisfy the required data service while controlling overheating/power-saving operation at the UE end.

In operation 1c-05, the base station 1c-02 may transmit a UE capability enquiry (UECapabilityEnquiry) message requesting a capability report to the UE 1c-01 in a connected state. The base station 1c-02 may include a UE capability enquiry for each radio access technology (RAT) type in the UECapabilityEnquiry message. The requested frequency band information may be included in the request for each RAT type. In addition, the UECapabilityEnquiry message may request a plurality of RAT types in one RRC message container. Alternatively, the base station 1c-02 may transmit each UECapabilityEnquiry message including the request for each RAT type to the UE 1c-01 a plurality of times. For example, the UECapabilityEnquiry message of operation 1c-05 may be transmitted once or repeated multiple times.

In addition, when the base station 1c-02 requests the UE 1c-01 to generate the UECapabilityInformation message in operation 1c-05, filtering information indicating conditions and restrictions may be included. Even though the capability of the UE 1c-01 is great, if the base station 1c-02 may not process and support the corresponding capability, it may be meaningless to receive a report of the capability of the corresponding UE 1c-01. Accordingly, the base station 1c-02 may limit the UE capability reported by the UE 1c-01 in order to receive only the UE capability information necessary for the base station 1c-02. In this way, the size of the UECapabilityInformation message reported by the UE 1c-01 may be reduced by the base station 1c-02 restricting the UE capabilities reported by the UE 1c-01.

In operation 1c-10, the UE 1c-01 may configure a UE capability information (UECapabilityInformation) message corresponding to the UECapabilityEnquiry message, match a response to the request, and report the same to the base station 1c-02. In a next-generation mobile communication system, UE capabilities for NR, LTE, and MR-DC including EN-DC may be requested. For reference, the UE capability enquiry (UECapabilityEnquiry) message may be initially transmitted after the UE 1c-01 connects and the base station 1c-02 recognizes. However, when the base station 1c-02 needs, the base station 1c-02 may request the UE 1c-01 to perform a UE capability under any condition.

In addition, in the message in operation 1c-10, the UE capability for reporting the UE assistance information may be included. Based on this, the base station 1c-02 may configure the UE 1c-01 to report required UE capability information in operation 1c-15.

In operation 1c-15, the base station 1c-02 may transmit necessary connection configuration information to the UE 1c-01. In this case, the base station 1c-02 may configure the UE 1c-01 to report reportable UE assistance information based on the UE capability information reported by the UE 1c-01 in operation 1c-10.

In operation 1c-20, the UE 1c-01 may notify the base station that the configuration information transmitted by the base station 1c-02 in operation 1c-15 has been received and applied.

In operation 1c-25, in a case where the operating condition for reporting UE assistance information is satisfied, the UE 1c-01 may include necessary UE assistance information in the UEAssistanceInformation message according to the configuration information transmitted by the base station 1c-02 in operation 1c-15 and then transmit the corresponding message to the base station 1c-02. In this case, information related to overheating/power-saving may be included in the message.

In operation 1c-30, the base station 1c-02 may transmit the modified connection configuration information based on the UE assistance information reported by the UE 1c-01 in operation 1c-25 to the UE 1c-01. For example, in operation 1c-25, if the UE assistance information is reported to the base station 1c-02 through the UEAssistanceInformation message and the message includes UE assistance information regarding overheating, the base station 1c-02, based on this, may transmit new connection configuration information to the UE 1c-01 to reduce the number of carriers, bandwidth, and number of MIMO layers used for UE connection in operation 1c-30.

In operation 1c-35, the UE 1c-01 may notify that the configuration information transmitted by the base station 1c-02 in operation 1c-30 has been received and applied.

FIG. 1D is a diagram illustrating names and ranges of frequency domains defined in an NR system according to an embodiment of the disclosure.

Referring to FIG. 1D, in the NR system, frequencies are divided into FR1 1d-05 and FR2 1d-10 in a large range. In addition, the FR2 band 1d-10 is further subdivided into the FR2-1 1d-15 band and the FR2-2 1d-20 band.

In 3GPP Rel-17, standards are being defined to extend the operating range of NR to 71 GHz. The following Table 1 is defined in the work item description (WID) of the corresponding work item (WI).

TABLE 1

From WID RP-210862
Note5: FR2 is extended to over 24.25 GHz to 71 GHz with FR2-1 for 24.25-52.6 GHz and FR2-2 for 52.6-71 GHz
  The related UE capabilities and their applicability to the frequency range 52.6 to 71 GHz will have to be analysed on a case by case basis
  The application of any of the UE feature introduced for 52.6-71 GHz to existing FR1/FR2 should be discussed case by case.
  TGS RAN specification shall make it very clear (to readers) that frequency bands in the 52.6-71 GHz range are only Release-independent from Rel-17 onwards, to ensure that there is clear industry understanding about which FR2 features are applicable for operation in 52.6-71 GHz range.
  NOTE 5a: Whenever theFR2 is referred, both FR2-1 and FR2-2 frequency sub-ranges shall be considered in this release, unless otherwise stated.
  NOTE 5b: The designations FR2-1 and FR2-2 should only be used when needed.

Referring to Table 1, to extend the FR2 band 1d-10 to include the 24.25 GHz to 71 GHz band, the frequency range (24.25 GHz to 52.6 GHz) defined as the FR2 band up to the existing Rel-16 is newly defined as FR2-1 1d-15 and the newly extended frequency range (52.6 GHz to 71 GHz) is defined as FR2-2 1d-20. In addition, functionally, WI includes introducing new SCS values of 480 kilohertz (kHz) and 960 kHz and defining a new maximum bandwidth to extend the operating range of NR to the FR2-2 band 1d-20. In addition, agreement on using the 480 kHz and 960 kHz SCS newly introduced in RAN1 and using up to 275 physical resource block (PRB) as before has been reached on. This means that even though the maximum number of available PRBs remains the same as before, a higher data rate may be provided as the symbol duration is shortened by a larger subcarrier spacing (SCS) value (for example, 960 kHz has a symbol duration 64 times shorter than 15 kHz and may provide a maximum data rate of 64 times or more.). This means that there is a big difference between NR operation in the existing FR2 band (i.e., the newly defined FR2-1 band 1*d*-15) and NR operation in the FR2-2 band 1*d*-20. In addition, this difference in operation may prevent various configuration information applied to the existing FR2 band (i.e., the newly defined FR2-1 band 1*d*-15) from being applied to the FR2-2 band 1*d*-20.

Accordingly, in the disclosure, when the UE reports necessary assistance information to the base station related to overheating and power-saving operation, parameters related to overheating and power-saving in UE assistance information may be newly defined so that information on the newly defined FR2-1 band and FR2-2 band may be reported separately. In addition, a new UE capability parameter may be defined so that the UE may inform the base station whether the UE may use the newly defined parameters, and a parameter for instructing the UE to use the newly defined parameters after the base station identifies these UE capability parameters may also be redefined.

According to the contents of the disclosure, the UE may separately report the maximum bandwidth and maximum MIMO layer available in each band among the UE assistance information related to overheating/power-saving for the FR2-1 band and the FR2-2 band. In addition, by subdividing and reconfiguring the operation in each band, it is possible to control overheating/power-saving problems at the UE and simultaneously optimize the data transmission service required in the upper layer. For example, a UE may simultaneously request a high-capacity data service and a low-latency data service. In this case, Carrier 1 (SCS 120 kHz, BW 400 MHz used, slot length 0.125 ms) may be configured in the FR2-1 band for high-capacity data service, and Carrier 2 (SCS 960 kHz, BW 400 MHz used, slot length 0.0156 ms) may be configured in the FR2-2 band for low-latency data service.

If the UE has an overheating problem and the bandwidth used in the FR2 band needs to be reduced to 400 MHz, since the maximum bandwidth in the FR2-1 band and the FR2-2 band may not be individually transmitted with the previously defined parameters, only one value (e.g., 400 MHz) must be transmitted to the base station by grouping the maximum bandwidth in the FR2-1 band and the FR2-2 band into the FR2 band. In this case, the base station selects one of various combinations so that the sum of the BWs of Carrier 1 or Carrier 2 is within 400 MHz and then modifies the connection configuration, and in this case, in terms of UE implementation, the base station may have limitations in determining the optimal connection configuration because detailed information on the overheating generated by each carrier configured in the FR2-1 and FR2-2 bands may not be reported to the base station. According to the disclosure, the UE may individually raise the UE assistance information on the overheating for the FR2-1 band and the FR2-2 band, so that the connection configuration of the base station may be optimized when the overheating problem occurs.

FIGS. 1EA and 1EB are diagrams illustrating UE capability information on whether parameters corresponding to the FR2-1 band and the FR2-2 band may be reported separately when a UE transmits UE assistance information related to overheating and power-saving to the base station according to various embodiments of the disclosure.

Referring to FIGS. 1EA and 1EB,

As in 1*e*-05, in a case where a UE includes UE assistance information on overheating when reporting UE capability information to the base station, an indicator (for example, overheatingInd-r17) indicating whether reporting may be performed for each of the FR2-1 band and the FR2-2 band or whether additional reporting may be performed only for the FR2-2 band may be newly defined. In this case, the indicator may be defined as 1-bit information in the form of ENUMERATED or other types of information, such as BOOLEAN or INTEGER.

As in 1*e*-10, in a case where a UE includes UE assistance information on power-saving when reporting UE capability information to the base station, a parameter (for example, PowSav-Parameters-r17) indicating whether reporting may be performed for each of the FR2-1 band and the FR2-2 band or whether additional reporting may be performed only for the FR2-2 band may be newly defined. In this case, the corresponding parameter may include an indicator for maximum bandwidth preference (maxBW-Preference-r17) and an indicator for maximum MIMO layer preference (maxMIMO-LayerPreference-r17). The aforementioned indicator may be defined as 1-bit information in the form of ENUMERATED or other types of information, such as BOOLEAN or INTEGER.

Terms representing the aforementioned parameters and indicators are terms defined based on functions in the disclosure, which may vary according to the intention or custom of a user or operator.

FIGS. 1FA and FB are diagrams illustrating newly defined UE assistance information so that the UE may report parameters corresponding to the FR2-1 band and the FR2-2 band separately when transmitting UE assistance information related to overheating to the base station according to various embodiments of the disclosure.

Referring to FIGS. 1FA and 1FB, 1*f*-05 and 1*f*-10 indicate previously defined overheating-related UE assistance information (OverheatingAssistance) and overheating-related UE assistance information (OverheatingAssistance-r17) newly defined to distinguish between FR2-1 band and FR2-2 band, respectively. The newly defined overheating-related UE assistance information 1*f*-10 may vary in whether to include parameters for FR1, FR2-1, and FR2-2 for each overheating-related parameter (reducedMaxBWxxx and reducedMaxMIMO-Layerxxx) according to the options described below.

Option 1: A method to restrict the use of the existing information (OverheatingAssistance, 1*f*-05) and the newly defined information (OverheatingAssistance-r17, 1*f*-10) together The base station may instruct the UE to report only one of the existing information (OverheatingAssistance) and the newly defined information (OverheatingAssistance-r17).

The UE may report only the information instructed by the base station in relation to overheating.

In the case of reporting the newly defined information (OverheatingAssistance-r17), all information on the FR1, FR2-1, and FR2-2 bands may be included for each overheating-related parameter (reducedMaxBWxxx and reducedMaxMIMO-Layerxxx).

In the case of using this option (option 1), the base station may instruct the UE to use only one form of existing information and new information, thereby reducing the load for generating and reporting UE assistance information generated at the UE end.

Option 2: A method to allow the use of existing information (OverheatingAssistance, 1*f*-05) and newly defined information (OverheatingAssistance-r17, 1*f*-10) together Option 2-1: A method that uses the existing information (OverheatingAssistance) and the newly defined information (OverheatingAssistance-r17) together, but does not allow the parameters for the FR2 band to be reported together within the two information.

For example, in a case where the UE includes the reducedMaxBW-FR2-1-r17 and reduce dMaxBW-FR2-2-r17 parameters in OverheatingAssistance-r17, reducedMaxBW-FR2-r16 parameter may not be included in OverheatingAssistance.

The base station may configure the UE to report both the existing information (OverheatingAssistance) and the newly defined information (OverheatingAssistance-r17).

The UE may report information instructed by the base station in relation to overheating. However, the existing information (OverheatingAssistance) and the newly defined information (OverheatingAssistance-r17) may not include parameters for the FR2 band together.

In a case where the newly defined information (OverheatingAssistance-r17) is reported together, information on the FR2-1 and FR2-2 bands may be included for each overheating-related parameter (reducedMaxBWxxx and reducedMaxMIMO-Layerxxx) (because the information on the FR1 band is already included in the existing information, it may not be included in the newly defined information.).

Option 2-2: A method that allows parameters for the FR2 band to be reported together within the existing information (OverheatingAssistance) and the newly defined information (OverheatingAssistance-r17).

For example, even though the UE has already included the reducedMaxBW-FR2-r16 parameter in OverheatingAssistance, the reducedMaxBW-FR2-1-r17 or the reducedMaxBW-FR2-2-r17 parameter may be additionally included in OverheatingAssistance-r17 to distinguish between the FR2-1 band and the FR2-2 band.

The base station may configure the UE to report both the existing information (OverheatingAssistance) and the newly defined information (OverheatingAssistance-r17).

The UE may report information instructed by the base station in relation to overheating. In this case, the existing information and the newly defined information may include parameters for the FR2 band together.

In a case where the newly defined information (OverheatingAssistance-r17) is reported together, information on the FR2-1 and FR2-2 bands may be included for each overheating-related parameter (reducedMaxBWxxx and reducedMaxMIMO-Layerxxx) (because the information on the FR1 band is already included in the existing information, it may not be included in the newly defined information.).

In a case where both the existing information (OverheatingAssistance) and the newly defined information (OverheatingAssistance-r17) include overheating-related parameters (reducedMaxBWxxx and reducedMaxMIMO-Layerxxx) for the FR2 band, the following options may be considered as a method of defining the relationship between the two information. For example, in a case where the UE reports the reducedMaxBW-FR2-r16 in OverheatingAssistance as 400 MHz and reducedMaxBW-FR2-1-r17 in OverheatingAssistance-r17 as 100 MHz, the relationship may be defined as in the example described below. In addition to the examples described below, relationships may be defined in various ways according to the user's convenience or understanding.

Example 1) because the maxBW for the entire FR2 band is 400 MHz and the maxBW for the FR2-1 band is 100 MHz, it may be interpreted that the maxBW for the FR2-2 band is 300 MHz.

Example 2) because the maxBW for the FR2 band is 400 MHz and only the maxBW for the FR2-1 band is reported as 100 MHz, the maxBW in the FR2-2 band may be interpreted as 400 MHz.

In addition, the FR2 band-related information in the existing information (OverheatingAssistance) may be interpreted as information on the FR2-1 band, and the newly defined information (OverheatingAssistance-r17) may include only information on the FR2-2 band. For example, in a case where the reducedMaxBW-FR2-r16 in OverheatingAssistance is reported as 100 MHz and the reducedMaxBW-FR2-2-r17 in OverheatingAssistance-r17 is reported as 400 MHz, the base station may interpret that the maxBW for the FR2-1 band is 100 MHz and the maxBW for the FR2-2 band is 400 MHz.

In a case where this option (option 2) is used, overheating-related information on the existing FR1 band and FR2 band may be reported individually. Parameters related to the FR1 band may be reported using the existing information (OverheatingAssistance), and parameters related to the FR2 band may be reported separately for FR2-1 and FR2-2 using new information (OverheatingAssistance-r17). By enabling individual reporting of information on the FR1 and FR2 bands, it is possible to efficiently report overheating-related UE assistance information.

FIGS. 1GA and GB are diagrams illustrating a newly defined UE assistance information so that a UE may report parameters corresponding to the FR2-1 band and the FR2-2 band separately when transmitting UE assistance information related to power-saving to the base station according to various embodiments of the disclosure.

Referring to FIGS. 1GA and GB, 1g-05 and 1g-10 indicate previously defined power-saving-related UE assistance information (MaxBW-Preference-r16/MaxMIMO-LayerPreference-r16) and power-saving-related UE assistance information (MaxBW-Preference-r17/MaxMIMO-LayerPreference-r17) newly defined to distinguish between FR2-1 band and FR2-2 band, respectively. The newly defined power-saving-related UE assistance information 1g-10 may vary in whether to include parameters for FR1, FR2-1, and FR2-2 for each power-saving-related parameter (MaxBW-Preference-r17 and MaxMIMO-LayerPreference-r17) according to the options described below.

Option 1: A method to restrict the use of the existing information (MaxBW-Preference-r16/MaxMIMO-LayerPreference-r16) and the newly defined information (MaxBW-Preference-r17/MaxMIMO-LayerPreference-r17) together The base station may instruct the UE to report only one of the existing information (MaxBW-Preference-r16/MaxMIMO-LayerPreference-r16) and the newly defined information (MaxBW-Preference-r17/MaxMIMO-LayerPreference-r17).

The UE may report only the information instructed by the base station in relation to power-saving.

In the case of reporting the newly defined information (MaxBW-Preference-r17/MaxMIMO-LayerPreference-r17), all information on the FR1, FR2-1, and FR2-2 bands may be included for each parameter.

In the case of using this option (option 1), the base station may instruct the UE to use only one form of existing information and new information, thereby reducing the load for generating and reporting UE assistance information generated at the UE end.

Option 2: A method to allow the use of existing information (MaxBW-Preference-r16/MaxMIMO-LayerPreference-r16) and newly defined information (MaxBW-Preference-r17/MaxMIMO-LayerPreference-r17) together Option 2-1: A method that uses the existing information (MaxBW-Preference-r16/MaxMIMO-LayerPreference-r16) and the newly defined information (MaxBW-Preference-r17/MaxMIMO-LayerPreference-r17) together, but does not allow the parameters for the FR2 band to be reported together within the two information. For example, in a case where the UE includes the reducedMaxBW-FR2-1-r17 and reducedMaxBW-FR2-2-r17 parameters in MaxBW-Preference-r17, reducedMaxBW-FR2-r16 parameter may not be included in MaxBW-Preference-r16.

The base station may configure the UE to report both the existing information (MaxBW-Preference-r16/MaxMIMO-LayerPreference-r16) and the newly defined information (MaxBW-Preference-r17/MaxMIMO-LayerPreference-r17).

The UE may report information instructed by the base station in relation to power-saving. However, the existing information and the newly defined information may not include parameters for the FR2 band together.

In a case where the newly defined information (MaxBW-Preference-r17/MaxMIMO-LayerPreference-r17) is reported together, information on the FR2-1 and FR2-2 bands may be included for each parameter (because the information on the FR1 band is already included in the existing information, it may not be included in the newly defined information.).

Option 2-2: A method that allows parameters for the FR2 band to be reported together within the existing information (MaxBW-Preference-r16/MaxMIMO-LayerPreference-r16) and the newly defined information (MaxBW-Preference-r17/MaxMIMO-LayerPreference-r17).

For example, even though the UE has already included the reducedMaxBW-FR2-r16 parameter in MaxBW-Preference-r16, the reducedMaxBW-FR2-1-r17 or the reducedMaxBW-FR2-2-r17 parameter may be additionally included in MaxBW-Preference-r17 to distinguish between the FR2-1 band and the FR2-2 band.

The base station may configure the UE to report both the existing information (MaxBW-Preference-r16/MaxMIMO-LayerPreference-r16) and the newly defined information (MaxBW-Preference-r17/MaxMIMO-LayerPreference-r17).

The UE may report information instructed by the base station in relation to power-saving. In this case, the existing information and the newly defined information may include parameters for the FR2 band together.

In a case where the newly defined information (MaxBW-Preference-r17/MaxMIMO-LayerPreference-r17) is reported together, information on the FR2-1 and FR2-2 bands may be included for each parameter (because the information on the FR1 band is already included in the existing information, it may not be included in the newly defined information.).

In a case where both the existing information (MaxBW-Preference-r16/MaxMIMO-LayerPreference-r16) and the newly defined information (MaxBW-Preference-r17/MaxMIMO-LayerPreference-r17) include each parameters for the FR2 band, the following options may be considered as a method of defining the relationship between the two information. For example, in a case where the UE reports the reducedMaxBW-FR2-r16 in MaxBW-Preference-r16 as 400 MHz and reducedMaxBW-FR2-1-r17 in MaxBW-Preference-r17 as 100 MHz, the relationship may be defined as in the example described below. In addition to the examples described below, relationships may be defined in various ways according to the user's convenience or understanding.

Example 1) because the maxBW for the entire FR2 band is 400 MHz and the maxBW for the FR2-1 band is 100 MHz, it may be interpreted that the maxBW for the FR2-2 band is 300 MHz.

Example 2) because the maxBW for the FR2 band is 400 MHz and only the maxBW for the FR2-1 band is reported as 100 MHz, the maxBW in the FR2-2 band may be interpreted as 400 MHz.

In addition, the FR2 band-related information in the existing information (MaxBW-Preference-r16/MaxMIMO-LayerPreference-r16) may be interpreted as information on the FR2-1 band, and the newly defined information (MaxBW-Preference-r17/MaxMIMO-LayerPreference-r17) may include only information on the FR2-2 band. For example, in a case where the reducedMaxBW-FR2-r16 in MaxBW-Preference-r16 is reported as 100 MHz and the reducedMaxBW-FR2-2-r17 in MaxBW-Preference-r17 is reported as 400 MHz, the base station may interpret that the maxBW for the FR2-1 band is 100 MHz and the maxBW for the FR2-2 band is 400 MHz.

In a case where this option (option 2) is used, power-saving-related information on the existing FR1 band and FR2 band may be reported individually. Parameters related to the FR1 band may be reported using the existing information (MaxBW-Preference-r16/MaxMIMO-LayerPreference-r16, and parameters related to the FR2 band may be reported separately for FR2-1 and FR2-2 using new information (MaxBW-Preference-r17/MaxMIMO-LayerPreference-r17. By enabling individual reporting of information on the FR1 and FR2 bands, it is possible to efficiently report power saving related UE assistance information.

FIG. 1H is a diagram illustrating base station configuration information for instructing a UE to separately report parameters corresponding to the FR2-1 band and the FR2-2 band when transmitting UE assistance information related to overheating to the base station according to an embodiment of the disclosure.

Referring to FIG. 1H, two options may be considered as a method for the base station to instruct the UE to separately report parameters corresponding to the FR2-1 band and the FR2-2 band using the newly defined overheating-related UE assistance information 1*f*-10 in FIG. 1FB.

Option A 1*h*-05: A method of configuring a report on new information 1*f*-10 separately from a report instruction on the existing information 1*f*-05.

In this case, reporting configuration on new information (OverheatingAssistance-r17) may be configured regardless of whether reporting configuration on existing information (OverheatingAssistance) is set.

Reporting configuration on new information (OverheatingAssistance-r17) may be set in two steps. A new nonCriticalExtension field may be added in OtherConfig IE, and SetupRelease for new information like overheatingAssistanceConfig-r17 1h-10 may be configured. When reporting configurations for new information are set up in 1h-10, the ProhibitTimer used for the corresponding report may be separately set as in overheatingIndicationProhibitTimer-r17 1h-15. The ProhibitTimer set here is used to prevent the report from being repeated too often, and may have a timer value separate from the ProhibitTimer set for the report of the existing information (Overheating Assistance).

When using this option (option A), the base station may separately configure an instruction to report existing information (OverheatingAssistance) and new information (OverheatingAssistance-r17) to the UE, and the UE does not have to report the information of the two forms 1f-05 and 1f-10 together every time, but reports only one of the two types as needed, enabling efficient UE assistance information reporting.

Option B 1h-20: A method of configuring a report on new information 1f-10 together with a report instruction on the existing information 1f-05.

In this case, the report on the new information (OverheatingAssistance-r17) may be configured together with the reporting configuration on the existing information (OverheatingAssistance).

Reporting on new information (OverheatingAssistance-r17) may be done together with reporting on existing information (OverheatingAssistance), and a 1-bit indicator (overheatingAssistancveConfig-r17) indicating whether reporting on new information should be made together with reporting on existing information may be defined as in 1h-25. In a case where the corresponding indicator is set to 'True', the UE may report new information together with the existing information, and the ProhibitTimer set for reporting the existing information may also be used for reporting new information.

When using this option (option B), the base station may configure both the existing information (OverheatingAssistance) and new information (OverheatingAssistance-r17) reporting instructions to the UE, and by using one ProhibitTimer together for information reporting in two forms 1f-05 and 1f-10, the UE operation burden may be alleviated.

FIG. 1I is a diagram illustrating base station configuration information for instructing a UE to separately report parameters corresponding to the FR2-1 band and the FR2-2 band when transmitting UE assistance information related to power-saving to the base station according to an embodiment of the disclosure.

Referring to FIG. 1I, two options may be considered as a method for the base station to instruct the UE to separately report parameters corresponding to the FR2-1 band and the FR2-2 band by using the newly defined power-saving-related UE assistance information 1g-10 in FIG. 1GB.

Option A 1i-05: A method of configuring a report on new information 1g-10 separately from a report instruction on the existing information 1g-05.

In this case, reporting configuration on new information (maxBW-Preference-r17/maxMIMO-LayerPreference-r17) may be configured regardless of whether reporting configuration on existing information (maxBW-Preference-r16/maxMIMO-LayerPreference-r16) is set.

Reporting configuration on new information (maxBW-Preference-r17/maxMIMO-LayerPreference-r17) may be set in two steps. A new nonCriticalExtension field may be added in OtherConfig IE, and SetupRelease for new information like maxBW-PreferenceConfig-r17/ maxMIMO-LayerPreferenceConfig-r17 1i-10/1i-15 may be configured. When reporting configurations for new information are set up in 1i-10/1i-15, the ProhibitTimer used for the corresponding report may be separately set as in 1i-20/1i-25. The ProhibitTimer set here is used to prevent the report from being repeated too often, and may have a timer value separate from the ProhibitTimer set for the report of the existing information (maxBW-Preference-r16/maxMIMO-LayerPreference-r16).

When using this option (option A), the base station may separately configure an instruction to report existing information (maxBW-Preference-r16/maxMIMO-LayerPreference-r16) and new information (maxBW-Preference-r17/maxMIMO-LayerPreference-r17) to the UE, and the UE does not have to report the information of the two forms 1g-05 and 1g-10 together every time, but reports only one of the two types as needed, enabling efficient UE assistance information reporting.

Option B 1i-30: A method of configuring a report on new information 1g-10 together with a report instruction on the existing information 1g-05.

In this case, the report on the new information (maxBW-Preference-r17/maxMIMO-LayerPreference-r17) may be configured together with the reporting configuration on the existing information (maxBW-Preference-r16/maxMIMO-LayerPreference-r16).

Reporting on new information (maxBW-Preference-r17/maxMIMO-LayerPreference-r17) may be done together with reporting on existing information (maxBW-Preference-r16/maxMIMO-LayerPreference-r16), and a 1-bit indicator (maxBW-PreferenceConfig-r17/maxMIMO-LayerPreferenceConfig-r17) indicating whether reporting on new information should be made together with reporting on existing information may be defined as in 1i-35/1i-40. In a case where the corresponding indicator is set to 'True', the UE may report new information together with the existing information, and the ProhibitTimer set for reporting the existing information may also be used for reporting new information.

When using this option (option B), the base station may configure both the existing information (maxBW-Preference-r16/maxMIMO-LayerPreference-r16) and new information (maxBW-Preference-r17/maxMIMO-LayerPreference-r17) reporting instructions to the UE, and by using one ProhibitTimer together for information reporting in two forms 1g-05 and 1g-10, the UE operation burden may be alleviated.

FIG. 1J is a flowchart illustrating an operation method in which a UE identifies the base station configuration information described in FIGS. 1H and 1I and then configures and reports parameters corresponding to the FR2 band according to the configured information when transmitting UE assistance information related to overheating and power-saving to the base station according to an embodiment of the disclosure.

Referring to FIG. 1J,

In operation 1j-01, the UE may start reporting user assistance information related to overheating and power-saving according to the procedure defined in the standard (TS 38.331, section 5.7.4).

In operation 1j-05, the UE may identify whether the reporting configuration indicator value in 1h and 1i described above is set to 'Setup' or 'True' among the information set in the OtherConfig IE for user report information by the base station.

In a case where the corresponding value is set to 'Setup' or 'True' as a result of identifying the indicator in operation 1*j*-05, the UE may separately include UE assistance information related to overheating/power-saving for the FR2 band for the FR2-1 band and the FR2-2 band in operation 1*j*-15, and in this case, may select and use one of the various options described in FIGS. 1FA, 1FB, 1GA, and 1GB, respectively.

In a case where the corresponding value is set to 'Release' or 'False' as a result of identifying the indicator in operation 1*j*-05, the UE may include UE assistance information related to overheating/power-saving for the FR2 band using the existing information 1*f*-5 and 1*g*-05 forms without separate distinction between the FR2-1 band and the FR2-2 band in operation 1*j*-15.

In operations 1*j*-25/1*j*-20, a UEAssistanceInformation message including parameters related to overheating/power-saving included in operations 1*j*-15/1*j*-10 respectively may be transmitted to the base station.

FIG. 1K is a diagram illustrating a procedure in which a UE reports overheating-related UE assistance information related to SCG to the master node (MN), the master node transmits the information to the secondary node (SN), and the secondary node modifies the SCG-related configuration information and transmits the same to the UE again through the master node in a dual connectivity situation according to an embodiment of the disclosure.

Referring to FIG. 1K,

In operation 1*k*-05, the master node 1*k*-02 may transmit a UE capability enquiry (UECapabilityEnquiry) message requesting a capability report to the UE 1*c*-01 in a connected state. The master node 1*k*-02 may include a UE capability enquiry for each RAT type in the UECapabilityEnquiry message. In addition, the UECapabilityEnquiry message may request a plurality of RAT types in one RRC message container. Alternatively, the master node 1*k*-02 may transmit each UECapabilityEnquiry message including a request for each RAT type to the UE 1*k*-01 a plurality of times. For example, the UECapabilityEnquiry message of operation 1*k*-05 may be transmitted once or repeated multiple times.

In addition, when the master node 1*k*-02 requests generation of the UECapabilityInformation message from the UE 1*k*-01 in operation 1*k*-05 above, filtering information indicating conditions and restrictions may be included. Even if the capability of the UE 1*k*-01 is great, if the base station 1*k*-02 may not process and support the corresponding capability, it may be meaningless to receive a report of the capability of the corresponding UE 1*k*-01. Therefore, the base station 1*k*-02 may limit the UE capability reported by the UE 1*k*-01 in order to receive only the UE capability information necessary for the base station 1*k*-02. In this way, the size of the UECapabilityInformation message reported by the UE 1*k*-01 may be reduced by limiting the UE capability reported by the UE 1*k*-01, by the base station 1*k*-02.

In operation 1*k*-10, the UE 1*k*-01 may configure a UECapabilityInformation message corresponding to the UECapabilityEnquiry message, match a response to the request, and report the message to the master node 1*k*-02. In a next-generation telecommunications system, UE capabilities for NR, LTE, and MR-DC including EN-DC may be requested. For reference, the UECapabilityEnquiry message may be initially transmitted after the UE 1*k*-01 connects and the base station 1*k*-02 finds out. However, under any condition when the base station 1*k*-02 is needed, the base station 1*k*-02 may request the UE capability from the UE 1*k*-01.

In addition, the message in operation 1*k*-10 above may include UE capability for reporting UE Assistance Information. Based on this, the base station 1*k*-02 may configure the UE 1*k*-01 to report necessary UE capability information in operation 1*k*-15 below. In the case of EN-DC, the ability to report SCG-related UE assistance information may be separately reported through the overheatingIndForSCG-r16 indicator in the current standard (e.g., TS 36.331). In addition, according to the embodiment of the disclosure, when the OverheatingAssistance-r17 information is newly defined in the NR standard (e.g., TS 38.331) to separately report the overheating-related UE assistance information in the FR2 band for each of the FR2-1 band and the FR2-2 band, an indicator, such as overheatingIndForSCG-r17 may be newly defined and reported to indicate the UE's reporting capability for the corresponding information.

In operation 1*k*-15, the master node 1*k*-02 may transmit necessary connection configuration information to the UE 1*k*-01. In this case, the base station 1*k*-02 may configure to report UE assistance information that the UE 1*k*-01 may report based on the UE capability information reported by the UE 1*k*-01 in operation 1*k*-10.

In addition, in the case of EN-DC, when the UE 1*k*-01 indicates that it is possible to report the overheating-related UE assistance information related to SCG in operation 1*k*-10, the master node 1*k*-02 may separately indicate reporting of overheating-related UE assistance information related to SCG through an indicator of overheatingAssistanceConfigurationForSCG-r16 defined in the LTE standard. In addition, according to the embodiment of the disclosure, when OverheatingAssistance-r17 information is newly defined in the NR standard (TS 38.331) to separately report overheating-related UE auxiliary information in the FR2 band for each of the FR2-1 band and the FR2-2 band, an indicator, such as OverheatingIndForSCG-r17 may be newly defined and reported to additionally indicate reporting of the corresponding information.

In operation 1*k*-20, the UE 1*k*-01 may notify that the master node 1*k*-02 has received and applied the configuration information transmitted in operation 1*k*-15.

In operation 1*k*-25, when the UE 1*k*-01 satisfies the operating condition for reporting the UE assistance information, after including necessary UE assistance information in the UEAssistanceInformation message according to the configuration information transmitted by the base station 1*k*-02 in operation 1*k*-15, the corresponding message may be transmitted to the base station 1*k*-02. At this time, information related to overheating/power-saving may be included.

In addition, in the case of EN-DC, when overheating-related UE assistance information reporting for SCG is configured in operation 1*k*-15, NR SCG-related UE assistance information according to the NR RRC standard (e.g., TS 38.331, section 5.7.4.3a) may be transmitted together. In addition, when instructed in operation 1*k*-15 to use the newly defined overheating-related UE assistance information 1*f*-10 to distinguish the FR2-1 and FR2-2 bands for the FR2 band, the overheating-related information in the SCG may be reported according to a newly defined format.

(When dual connectivity is configured) In operation 1*k*-30, when the master node 1*k*-02 includes information applicable to SCG among the overheating-related information reported from the UE 1k-01 in operation 1k-25, the corresponding information may be transmitted to the secondary node 1k-03 using the CG-Config-Info message. According to the definition of the current standard (TS 38.331), allowedReducedConfigForOverheating-r16 (for NR-DC) or overheatingAssistanceSCG (for EN-DC) may be included in CG-ConfigInfo. In addition, when the UE 1k-01 reports overheating information in operation 1k-25 using the newly defined overheating-related UE assistance information 1f-10 to distinguish the FR2-1 and FR2-2 bands for the FR2 band, the overheating-related information transmitted from the master node 1k-02 to the secondary node 1k-03 through CG-ConfigInfo may also be distinguished for each of the FR2-1 band and the FR2-2 band.

In operation 1k-35, the secondary node 1k-03 modifies the related SCG connection information based on the information in CG-ConfigInfo received from the master node 1k-02 in operation 1k-30, and then, transmit this message back to the master node 1k-02 through a CG-Config message.

In operation 1k-40, the base station 1k-02 may transmit the modified connection configuration information to the UE 1k-01, based on the UE assistance information reported by the UE 1k-01 in operation 1k-25. For example, in operation 1k-25, if the UE assistance information is reported through the transmission of the UEAssistanceInformation message due to the overheating of the UE 1k-01 and the message includes the UE assistance information regarding the overheating and is transmitted to the base station 1k-02, based on this, the base station 1k-02 may transmit new connection configuration information to the UE 1k-01 to reduce the number of carriers, bandwidth, and number of MIMO layers used for UE connection in the process of 1k-40. In addition, when dual connectivity is configured, and in operation 1k-25, the UE 1k-01 includes SCG-related information, the master node 1k-02 transmits the information to the secondary node 1k-03 and the secondary node 1k-03 modifies the SCG-related connection configuration, the configuration information changed in relation to SCG may also be included in the message.

In operation 1k-45, the UE 1k-01 may notify that the base station 1k-02 has received and applied the configuration information transmitted in operation 1k-40.

Figure 2:
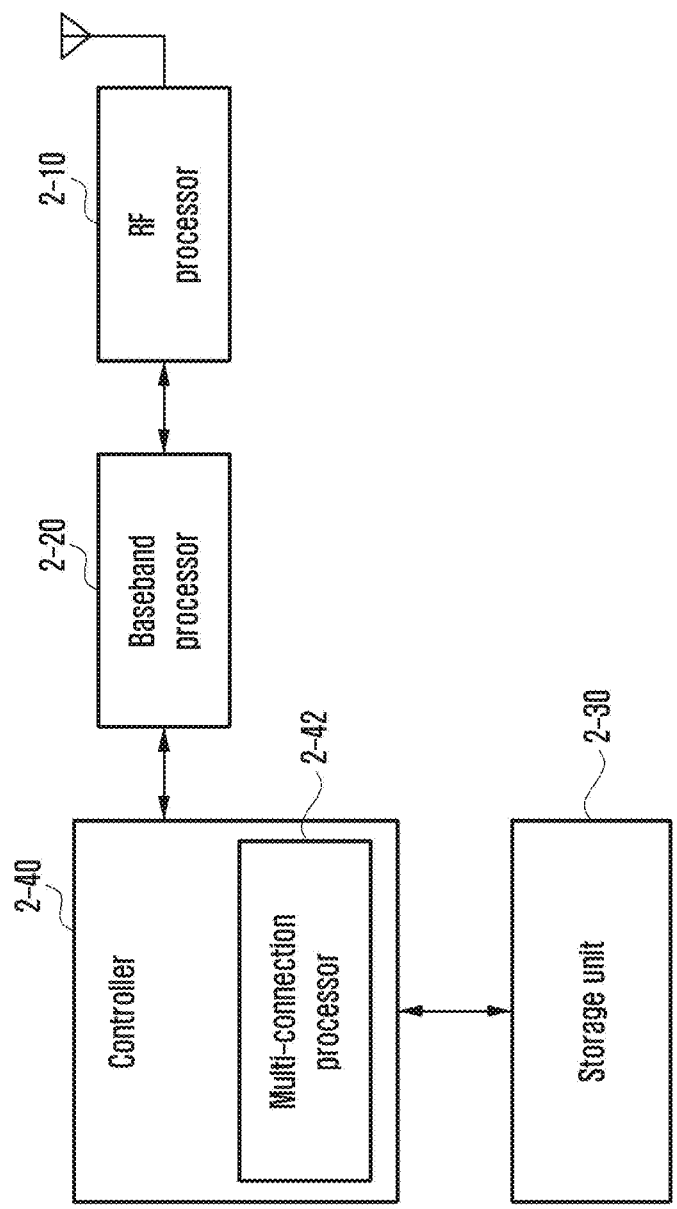
FIG. 2 is a diagram illustrating a UE according to an embodiment of the disclosure.

FIG. 2 is a diagram illustrating a UE according to an embodiment of the disclosure.

Referring to FIG. 2, the UE may include a radio frequency (RF) processor 2-10, a baseband processor 2-20, a storage unit 2-30, and a controller 2-40. A configuration of the UE is not limited to the configuration illustrated in FIG. 2 and may include fewer or more configurations than the configuration illustrated in FIG. 2.

The RF processor 2-10 may perform functions for transmitting and receiving signals through a radio channel, such as band conversion and amplification of signals. For example, the RF processor 2-10 may up-convert the baseband signal provided from the baseband processor 2-20 into an RF band signal and transmit the signal through an antenna, and may down-convert an RF band signal received through an antenna into a baseband signal. For example, the RF processor 2-10 may include a transmission filter, a reception filter, an amplifier, a mixer, an oscillator, a digital to analog converter (DAC), an analog to digital converter (ADC), and the like, but is not limited to these examples. Referring to FIG. 2, only one antenna is illustrated, but the UE may include a plurality of antennas. In addition, the RF processor 2-10 may include a plurality of RF chains. Furthermore, the RF processor 2-10 may perform beamforming. For beamforming, the RF processor 2-10 may adjust the phase and size of signals transmitted and received through a plurality of antennas or antenna elements. In addition, the RF processor 2-10 may perform MIMO, and may receive multiple layers when performing the MIMO operation.

The baseband processor 2-20 may perform a conversion function between a baseband signal and a bit stream according to the physical layer standard of the system. For example, during data transmission, the baseband processor 2-20 may generate complex symbols by encoding and modulating a transmission bit stream. In addition, when receiving data, the baseband processor 2-20 may demodulate and decode the baseband signal provided from the RF processing unit 2-10 to restore the received bit stream. For example, in the case of orthogonal frequency division multiplexing (OFDM), during data transmission, the baseband processor 2-20 may encode and modulate a transmission bit stream to generate complex symbols, map the generated complex symbols to subcarriers, and then, configure OFDM symbols through an inverse fast Fourier transform (IFFT) operation and cyclic prefix (CP) insertion. In addition, when receiving data, the baseband processor 2-20 may divide the baseband signal provided from the RF processor 2-10 into OFDM symbol units, restore signals mapped to the subcarriers through the fast Fourier transform (FFT) operation, and then, restore the received bit stream through demodulation and decoding.

The baseband processor 2-20 and the RF processor 2-10 may transmit and receive signals as described above. Accordingly, the baseband processor 2-20 and the RF processor 2-10 may be referred to as a transmitter, a receiver, a transceiver, or a communication unit. Furthermore, at least one of the baseband processor 2-20 and the RF processor 2-10 may include a plurality of communication modules to support a plurality of different radio access technologies. In addition, at least one of the baseband processor 2-20 and the RF processor 2-10 may include different communication modules to process signals of different frequency ranges. For example, different radio access technologies may include a wireless local area network (LAN) (e.g., institute of electrical and electronics engineers (IEEE) 802.11), a cellular network (e.g., LTE), and the like. In addition, the different frequency ranges may include a super high frequency (SHF) (e.g., 2.NRHz, NRhz) band and a millimeter wave (e.g., 60 GHz) band. The UE may transmit and receive signals with the base station using the baseband processor 2-20 and the RF processor 2-10, and the signal may include control information and data.

The storage unit 2-30 may store data, such as a basic program for operation of the UE, an application program, and configuration information. For example, the storage unit 2-30 may store data information, such as a basic program for operating a UE, an application program, and configuration information. In addition, the storage unit 2-30 may provide the stored data according to the request of the controller 2-40.

The storage unit 2-30 may include a storage medium, such as a read only memory (ROM), a random-access memory (RAM), a hard disk, a compact disc read only memory (CD-ROM), and a digital versatile disc (DVD), or a combination of storage media. In addition, the storage unit 2-30 may be including a plurality of memories. According to an embodiment of the disclosure, the storage unit 2-30 may store a program for performing the handover method according to the disclosure.

The controller 2-40 may control overall operations of the UE. For example, the control unit 2-40 may transmit and receive signals through the baseband processor 2-20 and the RF processor 2-10.

In addition, the controller 2-40 may write and read data in and from the storage unit 2-30. To this end, the controller 2-40 may include at least one processor. For example, the controller 2-40 may include a communication processor (CP) that controls communication and an application processor (AP) that controls upper layers, such as application programs. In addition, according to an embodiment of the disclosure, the controller 2-40 may include a multi-connection processor 2-42 configured to process a process operating in a multi-connection mode. In addition, at least one component in the UE may be implemented as one chip.

Figure 3:
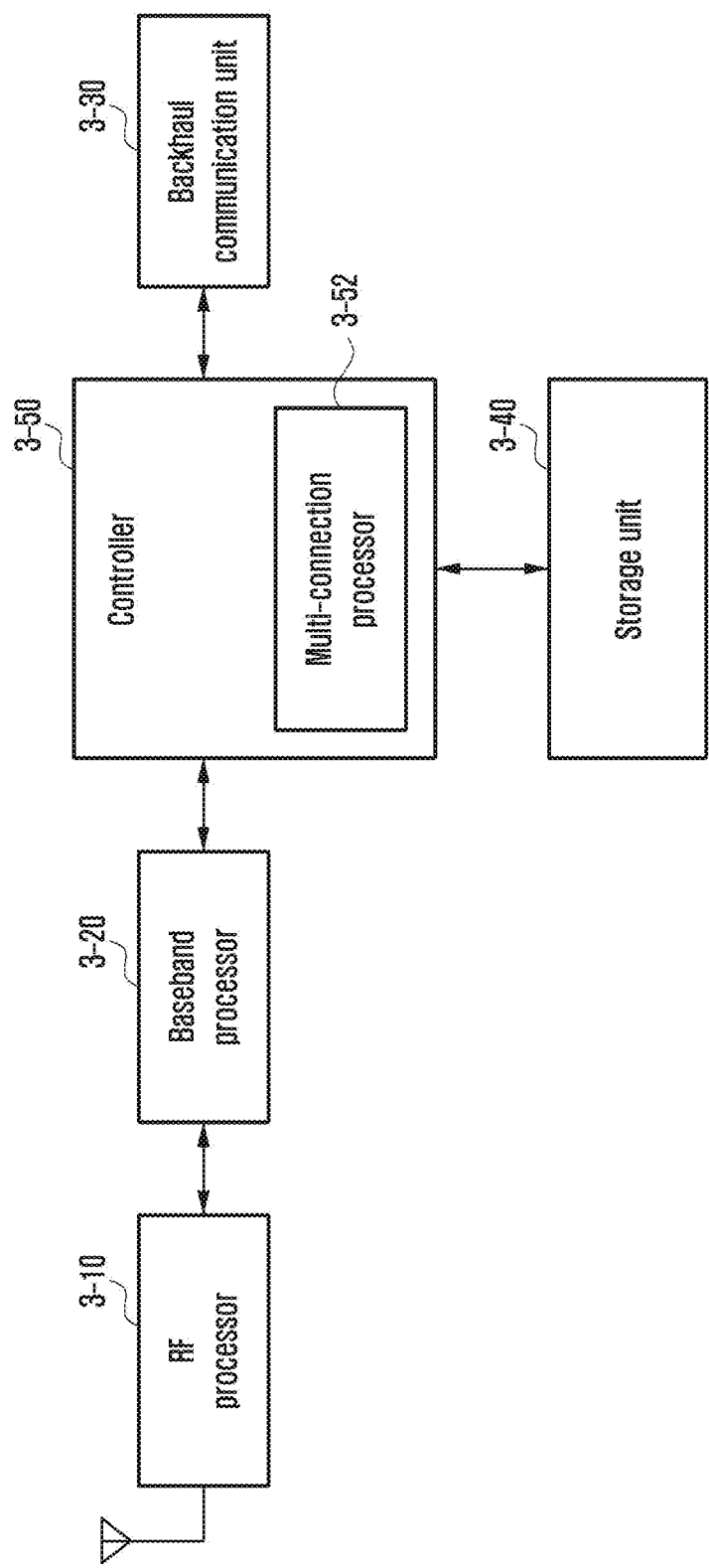
FIG. 3 is a diagram illustrating a base station according to an embodiment of the disclosure.

FIG. 3 is a diagram illustrating a base station according to an embodiment of the disclosure, and the base station of FIG. 3 may correspond to an entity or a node included in the aforementioned network according to an embodiment of the disclosure.

Referring to FIG. 3, the base station may include an RF processor 3-10, a baseband processor 3-20, a backhaul communication unit 3-30, a storage unit 3-40, and a controller 3-50. The configuration of the base station is not limited to the configuration illustrated in FIG. 3, and the base station may include fewer or more components than the components illustrated in FIG. 3. The RF processor 3-10 may perform functions for transmitting and receiving signals through a wireless channel, such as band conversion and amplification of signals. For example, the RF processor 3-10 may up-convert the baseband signal provided from the baseband processor 3-20 into an RF band signal and transmit the same through an antenna, and may down-convert an RF band signal received through an antenna into a baseband signal. For example, the RF processor 3-10 may include a transmission filter, a reception filter, an amplifier, a mixer, an oscillator, a DAC, an ADC, and the like. Referring to FIG. 3, only one antenna is illustrated, but the RF processor 3-10 may include a plurality of antennas. In addition, the RF processor 3-10 may include a plurality of RF chains. Furthermore, the RF processor 3-10 may perform beamforming. For beamforming, the RF processor 3-10 may adjust the phase and size of signals transmitted and received through a plurality of antennas or antenna elements. The RF processor 3-10 may perform a downlink MIMO operation by transmitting one or more layers.

The baseband processor 3-20 may perform a conversion function between a baseband signal and a bit stream according to the physical layer standard. For example, during data transmission, the baseband processor 3-20 may generate complex symbols by encoding and modulating a transmission bit stream. In addition, when receiving data, the baseband processor 3-20 may demodulate and decode the baseband signal provided from the RF processor 3-10 to restore the received bit stream. For example, according to the OFDM method, when transmitting data, the baseband processor 3-20 may generate complex symbols by encoding and modulating a transmission bit stream, map the generated complex symbols to subcarriers, and then configure OFDM symbols through IFFT operation and CP insertion after. In addition, when receiving data, the baseband processor 3-20 may divide the baseband signal provided from the RF processor 3-10 into OFDM symbol units, restore signals mapped to subcarriers through FFT operation, and then restore the received bit stream through demodulation and decoding. The baseband processor 3-20 and the RF processor 3-10 may transmit and receive signals as described above. Accordingly, the baseband processor 3-20 and the RF processor 3-10 may be referred to as a transmitter, a receiver, a transceiver, a communication unit, or a wireless communication unit. The base station may transmit/receive signals with the UE using the baseband processor 3-20 and the RF processor 3-10, and the signal may include control information and data.

The backhaul communication unit 3-30 may provide an interface for communicating with other nodes in the network. For example, the backhaul communication unit 3-30 may convert a bit stream transmitted from the master node to another node, for example, a secondary node or a core network, into a physical signal, and convert a physical signal received from another node into a bit stream.

The storage unit 3-40 may store data, such as a basic program for operation of the master node, an application program, and configuration information. For example, the storage unit 3-40 may store information about a bearer assigned to a connected UE, measurement results reported from the connected UE, and the like. In addition, the storage unit 3-40 may store information that is a criterion for determining whether to provide or stop multiple connections to the UE. In addition, the storage unit 3-40 may provide the stored data according to the request of the controller 3-50. The storage unit 3-40 may be configured with a storage medium, such as a ROM, a RAM, a hard disk, a CD-ROM, and a DVD, or a combination of storage media. In addition, the storage unit 3-40 may be including a plurality of memories. According to an embodiment of the disclosure, the storage unit 3-40 may store a program for performing handover according to the disclosure.

The controller 3-50 may control overall operations of the master node. For example, the controller 3-50 may transmit and receive signals through the baseband processor 3-20 and the RF processor 3-10 or through the backhaul communication unit 3-30. In addition, the controller 3-50 may write and read data in and from the storage unit 3-40. To this end, the controller 3-50 may include at least one processor. In addition, according to an embodiment of the disclosure, the controller 3-50 may include a multi-connection processor 3-52 configured to process a process operating in a multi-connection mode.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), a wide LAN (WLAN), and storage area network (SAN) or a combination thereof. Such a storage device may access the electronic device via an external port. Further, a separate storage device on the communication network may access a portable electronic device.

In the disclosure, the term "computer program product" or "computer readable medium" is used to generally refer to a medium, such as a memory, a hard disk installed in a hard disk drive, or a signal. The "computer program product" or "computer readable medium" is an element that is provided to a method for reporting UE capability in a wireless communication system according to the disclosure.

A machine-readable storage medium may be provided in the form of a non-transitory storage medium. Wherein, the term "non-transitory storage medium" simply means that the storage medium is a tangible device, and does not include a signal (e.g., an electromagnetic wave), but this term does not differentiate between where data is semi-permanently stored in the storage medium and where the data is temporarily stored in the storage medium. As an example, the "non-transitory storage medium" may include a buffer in which data is temporarily stored According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least a part of the computer program product (e.g., a downloadable app) may be temporarily generated or at least temporarily stored in the machine-readable storage medium, such as the memory of the manufacturer's server, a server of the application store, or a relay server.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. For example, it will be apparent to those skilled in the art that other variants based on the technical idea of the disclosure may be implemented.

Furthermore, the above respective embodiments may be employed in combination, as necessary. For example, all or a part of one embodiment of the disclosure may be combined with all or a part of another embodiment to operate a base station and a terminal. In addition, the embodiments of the disclosure may be applied to other communication system, and other variants based on the technical idea of the embodiments may also be implemented. For example, the embodiments may be applied to LTE, 5G, NR, or 6G systems. Therefore, the scope of the disclosure should not be defined as being limited to the embodiments set forth herein, but should be defined by the appended claims and equivalents thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   transmitting, to a base station, information on capability of the terminal including information indicating whether the terminal supports to transmit at least one parameter for a power saving associated with a frequency range 2-2;
   receiving, from the base station, first configuration information for configuring the terminal to transmit at least one parameter for a power saving associated with a frequency range 2-1 and second configuration information for configuring the terminal to transmit the at least one parameter for the power saving associated with the frequency range 2-2; and
   transmitting, to the base station, assistance information on the terminal, the assistance information on the terminal comprising information on the at least one parameter for the power saving associated with the frequency range 2-2.

2. The method of claim 1,
   wherein the information indicating whether the terminal supports to transmit the at least one parameter for the power saving associated with a frequency range 2-2 comprises at least one of information whether the terminal supports to transmit information on a maximum aggregated bandwidth preference associated with the frequency range 2-2 or information whether the terminal supports to transmit information on a maximum number of multi input multi output (MIMO) layer preference associated with the frequency range 2-2, and
   wherein the information on the at least one parameter for the power saving associated with the frequency range 2-2 comprises at least one of information indicating a reduced maximum aggregated bandwidth preference associated with the frequency range 2-2 or information indicating a reduced maximum number of MIMO layer preference associated with the frequency range 2-2.

3. The method of claim 1,
   wherein the first configuration information comprises information on a prohibit timer for a power saving, and
   wherein the information on the at least one parameter for the power saving associated with the frequency range 2-2 is transmitted based on the prohibit timer.

4. The method of claim 1, further comprising:
   receiving, from the base station, third configuration information for configuring the terminal to transmit information on an overheating of the terminal; and
   transmitting, to the base station, the information on the overheating of the terminal associated with the frequency range 2-1 and the information on the overheating of the terminal associated with the frequency range 2-2, wherein the information on the overheating associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

5. The method of claim 1, wherein the frequency range 2-1 corresponds to a frequency range from 24250 MHz to 52600 MHz and the frequency range 2-2 corresponds to a frequency range from 52600 MHz to 71000 MHz.

6. A method performed by a base station in a wireless communication system, the method comprising:
receiving, from a terminal, information on capability of the terminal including information indicating whether the terminal supports to transmit at least one parameter for a power saving associated with a frequency range 2-2;
transmitting, to the terminal, first configuration information for configuring the terminal to transmit at least one parameter for a power saving associated with a frequency range 2-1 and second configuration information for configuring the terminal to transmit the at least one parameter for the power saving associated with the frequency range 2-2; and
receiving, from the terminal, assistance information on the terminal, the assistance information on the terminal comprising information on the at least one parameter for the power saving associated with the frequency range 2-2.

7. The method of claim 6,
wherein the information indicating whether the terminal supports to transmit the at least one parameter for the power saving associated with a frequency range 2-2 comprises at least one of information whether the terminal supports to transmit information on a maximum aggregated bandwidth preference associated with the frequency range 2-2 or information whether the terminal supports to transmit information on a maximum number of multi input multi output (MIMO) layer preference associated with the frequency range 2-2, and
wherein the information on the at least one parameter for the power saving associated with the frequency range 2-2 comprises at least one of information indicating a reduced maximum aggregated bandwidth preference associated with the frequency range 2-2 or information indicating a reduced maximum number of MIMO layer preference associated with the frequency range 2-2.

8. The method of claim 6,
wherein the first configuration information comprises information on a prohibit timer for a power saving, and
wherein the information on the at least one parameter for the power saving associated with the frequency range 2-2 is received based on the prohibit timer.

9. The method of claim 6, further comprising:
transmitting, to the terminal, third configuration information for configuring the terminal to transmit information on an overheating of the terminal; and
receiving, from the terminal, the information on the overheating of the terminal associated with the frequency range 2-1 and the information on the overheating of the terminal associated with the frequency range 2-2,
wherein the information on the overheating associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

10. The method of claim 6, wherein the frequency range 2-1 corresponds to a frequency range from 24250 MHz to 52600 MHz and the frequency range 2-2 corresponds to a frequency range from 52600 MHz to 71000 MHz.

11. A terminal in a wireless communication system, the terminal comprising:
a transceiver; and
a controller coupled with the transceiver and configured to:
transmit, to a base station, information on capability of the terminal including information indicating whether the terminal supports to transmit at least one parameter for a power saving associated with a frequency range 2-2,
receive, from the base station, first configuration information for configuring the terminal to transmit at least one parameter for a power saving associated with a frequency range 2-1 and second configuration information for configuring the terminal to transmit the at least one parameter for the power saving associated with the frequency range 2-2, and
transmit, to the base station, assistance information on the terminal, the assistance information on the terminal comprising information on the at least one parameter for the power saving associated with the frequency range 2-2.

12. The terminal of claim 11,
wherein the information indicating whether the terminal supports to transmit the at least one parameter for the power saving associated with a frequency range 2-2 comprises at least one of information whether the terminal supports to transmit information on a maximum aggregated bandwidth preference associated with the frequency range 2-2 or information whether the terminal supports to transmit information on a maximum number of multi input multi output (MIMO) layer preference associated with the frequency range 2-2, and
wherein the information on the at least one parameter for the power saving associated with the frequency range 2-2 comprises at least one of information indicating a reduced maximum aggregated bandwidth preference associated with the frequency range 2-2 or information indicating a reduced maximum number of MIMO layer preference associated with the frequency range 2-2.

13. The terminal of claim 11,
wherein the first configuration information comprises information on a prohibit timer for a power saving, and
wherein the information on the at least one parameter for the power saving associated with the frequency range 2-2 is transmitted based on the prohibit timer.

14. The terminal of claim 11,
wherein the controller is further configured to:
receive, from the base station, third configuration information for configuring the terminal to transmit information on an overheating of the terminal, and
transmit, to the base station, the information on the overheating of the terminal associated with the frequency range 2-1 and the information on the overheating of the terminal associated with the frequency range 2-2, and
wherein the information on the overheating associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

15. The terminal of claim 11, wherein the frequency range 2-1 corresponds to a frequency range from 24250 MHz to 52600 MHz and the frequency range 2-2 corresponds to a frequency range from 52600 MHz to 71000 MHz.

16. A base station in a wireless communication system, the base station comprising:
a transceiver; and
a controller coupled with the transceiver and configured to:
receive, from a terminal, information on capability of the terminal including information indicating whether the terminal supports to transmit at least one parameter for a power saving associated with a frequency range 2-2,
transmit, to the terminal, first configuration information for configuring the terminal to transmit at least one parameter for a power saving associated with a frequency range 2-1 and second configuration information for configuring the terminal to transmit the at least one parameter for the power saving associated with the frequency range 2-2, and
receive, from the terminal, assistance information on the terminal, the assistance information on the terminal comprising information on the at least one parameter for the power saving associated with the frequency range 2-2.

17. The base station of claim 16,
wherein the information indicating whether the terminal supports to transmit the at least one parameter for the power saving associated with a frequency range 2-2 comprises at least one of information whether the terminal supports to transmit information on a maximum aggregated bandwidth preference associated with the frequency range 2-2 or information whether the terminal supports to transmit information on a maximum number of multi input multi output (MIMO) layer preference associated with the frequency range 2-2, and
wherein the information on the at least one parameter for the power saving associated with the frequency range 2-2 comprises at least one of information indicating a reduced maximum aggregated bandwidth preference associated with the frequency range 2-2 or information indicating a reduced maximum number of MIMO layer preference associated with the frequency range 2-2.

18. The base station of claim 16,
wherein the first configuration information comprises information on a prohibit timer for a power saving, and
wherein the information on the at least one parameter for the power saving associated with the frequency range 2-2 is received based on the prohibit timer.

19. The base station of claim 16,
wherein the controller is further configured to:
transmit, to the terminal, configuration information for configuring the terminal to transmit information on an overheating of the terminal, and
receive, from the terminal, the information on the overheating of the terminal associated with the frequency range 2-1 and the information on the overheating of the terminal associated with the frequency range 2-2, and
wherein the information on the overheating associated with the frequency range 2-2 comprises at least one of information indicating a reduced maximum aggregated bandwidth preference associated with the frequency range 2-2 or information indicating a reduced maximum number of multi input multi output (MIMO) layer preference associated with the frequency range 2-2.

20. The base station of claim 16, wherein the frequency range 2-1 corresponds to a frequency range from 24250 MHz to 52600 MHz and the frequency range 2-2 corresponds to a frequency range from 52600 MHz to 71000 MHz.

* * * * *